United States Patent
Lee et al.

(10) Patent No.: US 10,515,605 B2
(45) Date of Patent: Dec. 24, 2019

(54) DISPLAY DEVICE WITH CORRECTED GATE-OFF VOLTAGE AND METHOD OF OPERATING THE SAME

(71) Applicant: SAMSUNG DISPLAY CO., LTD., Yongin-si, Gyeonggi-Do (KR)

(72) Inventors: Hongbeom Lee, Hwaseong-si (KR); Jihoon Shin, Asan-si (KR); Yeunmo Yeon, Asan-si (KR); Eunkyung Kim, Asan-si (KR); Minho Park, Asan-si (KR); Chowon Park, Cheonan-si (KR); Yina Yun, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 72 days.

(21) Appl. No.: 15/887,018

(22) Filed: Feb. 2, 2018

(65) Prior Publication Data

US 2018/0218703 A1  Aug. 2, 2018

(30) Foreign Application Priority Data

Feb. 2, 2017 (KR) .................. 10-2017-0014820

(51) Int. Cl.
*G09G 3/36* (2006.01)
*G02F 1/1362* (2006.01)
*G02F 1/1337* (2006.01)

(52) U.S. Cl.
CPC ..... *G09G 3/3688* (2013.01); *G02F 1/136286* (2013.01); *G09G 3/3648* (2013.01);
(Continued)

(58) Field of Classification Search
CPC ....... G09G 2320/043; G09G 2320/045; G09G 3/3688; G09G 3/3648; G09G 3/3655; G09G 3/3696; G02F 1/136286
See application file for complete search history.

(56) References Cited

U.S. PATENT DOCUMENTS

| 7,924,041 | B2 | 4/2011 | No et al. |
| 9,019,187 | B2 | 4/2015 | Moon et al. |

(Continued)

FOREIGN PATENT DOCUMENTS

| KR | 10-1441958 | 9/2014 |
| KR | 10-1448006 | 9/2014 |
| KR | 10-1520504 | 5/2015 |

*Primary Examiner* — Lixi C Simpson
(74) *Attorney, Agent, or Firm* — F. Chau & Associates, LLC

(57) ABSTRACT

A display device includes: a substrate; a gate line, a dummy gate line, a data line, a dummy data line, a pixel electrode, and a dummy pixel electrode, each disposed on the substrate; a switching element connected to the gate line, the data line, and the pixel electrode; a dummy switching element connected to the dummy gate line, the dummy data line, and the dummy pixel electrode; a compensation circuit detecting a change amount of a drain current based on drain currents generated from the dummy pixel at different time points, and detecting a change amount of a gate voltage of the dummy switching element based on the change amount of the drain current; a power supply circuit outputting a corrected gate-off voltage based on the change amount of the gate voltage; and a gate driver applying the corrected gate-off voltage to the gate line.

21 Claims, 16 Drawing Sheets

(52) U.S. Cl.
CPC ......... *G09G 3/3655* (2013.01); *G09G 3/3696* (2013.01); *G02F 1/13624* (2013.01); *G02F 1/133707* (2013.01); *G09G 2300/0413* (2013.01); *G09G 2310/027* (2013.01); *G09G 2310/0297* (2013.01); *G09G 2310/067* (2013.01); *G09G 2320/029* (2013.01); *G09G 2320/0214* (2013.01); *G09G 2320/048* (2013.01)

(56) References Cited

U.S. PATENT DOCUMENTS

| | | | |
|---|---|---|---|
| 2007/0052646 A1* | 3/2007 | Ishiguchi | G09G 3/3648 345/92 |
| 2008/0150856 A1* | 6/2008 | Nam | G09G 3/006 345/87 |
| 2010/0066724 A1* | 3/2010 | Huh | G09G 3/3677 345/213 |
| 2016/0104429 A1 | 4/2016 | Kang | |
| 2017/0186369 A1* | 6/2017 | Hayashi | G09G 3/3233 |

\* cited by examiner

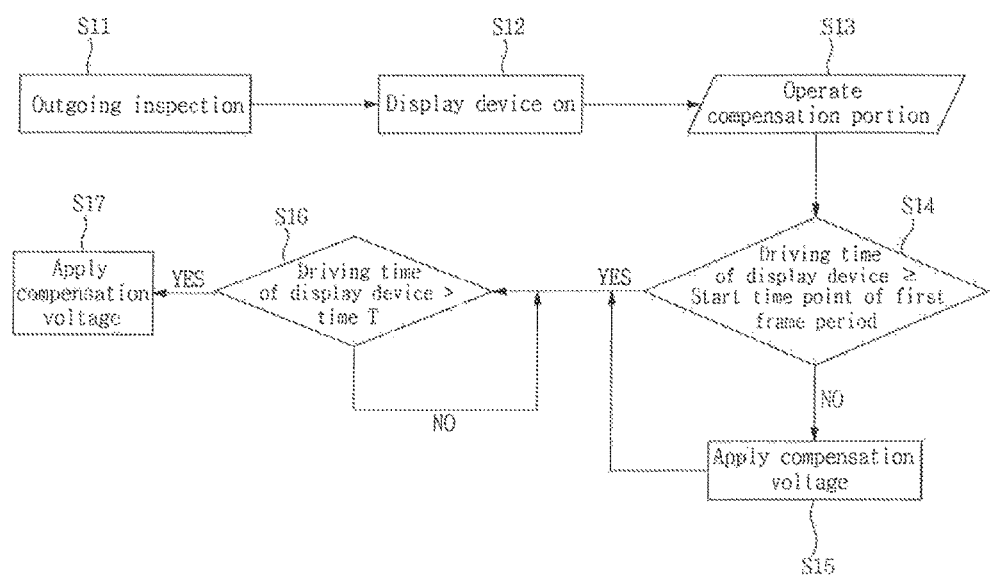

DISPLAY DEVICE WITH CORRECTED GATE-OFF VOLTAGE AND METHOD OF OPERATING THE SAME

CROSS-REFERENCE TO RELATED APPLICATION

This application claims priority under 35 U.S.C. § 119 to Korean Patent Application No. 10-2017-0014820, filed on Feb. 2, 2017, in the Korean Intellectual Property Office (KIPO), the disclosure of which is incorporated by reference herein in its entirety.

TECHNICAL FIELD

Exemplary embodiments of the inventive concept relate to a display device capable of substantially minimizing a leakage current of a switching element by correcting a gate-off voltage to an optimum value in real time.

DISCUSSION OF RELATED ART

Liquid crystal display ("LCD") devices are one of most widely used types of flat panel display ("FPD") devices. An LCD device includes two substrates with electrodes formed thereon and a liquid crystal layer interposed therebetween. Upon applying a voltage to the electrodes, liquid crystal molecules of the liquid crystal layer are rearranged such that an amount of transmitted light is controlled in the LCD device.

SUMMARY

According to an exemplary embodiment of the inventive concept, a display device includes: a substrate; a gate line, a dummy gate line, a data line, a dummy data line, a pixel electrode, and a dummy pixel electrode, each disposed on the substrate; a switching element connected to the gate line, the data line, and the pixel electrode; a dummy switching element connected to the dummy gate line, the dummy data line, and the dummy pixel electrode; a compensation circuit detecting a change amount of a drain current based on drain currents generated from the dummy pixel at different time points, and detecting a change amount of a gate voltage of the dummy switching element in a linear region including a threshold voltage of the dummy switching element, based on the change amount of the drain current; a power supply circuit correcting and outputting a gate-off voltage based on the change amount of the gate voltage detected by the compensation circuit; and a gate driver applying the gate-off voltage from the power supply circuit to the gate line.

The dummy gate line may include a first dummy gate line, a second dummy gate line, and a third dummy gate line separated from one another. The dummy pixel electrode may include a first dummy pixel electrode, a second dummy pixel electrode, and a third dummy pixel electrode separated from one another. The dummy switching element may include: a first dummy switching element connected to the first dummy gate line, the dummy data line, and the first dummy pixel electrode; a second dummy switching element connected to the second dummy gate line, the dummy data line, and the second dummy pixel electrode; and a third dummy switching element connected to the third dummy gate line, the dummy data line, and the third dummy pixel electrode.

The different time points may include a first time point and a second time point that is delayed in time with respect to the first time point. At the first time point and the second time point, the compensation circuit may apply a first gate voltage to the first dummy gate line, apply a second gate voltage different from the first gate voltage to the second dummy gate line, apply a third gate voltage different from the second gate voltage to the third dummy gate line, apply a dummy data voltage to the dummy data line, receive a first drain current from the first dummy pixel electrode, receive a second drain current from the second dummy pixel electrode, and receive a third drain current from the third dummy pixel electrode.

The first gate voltage, the second gate voltage, and the third gate voltage may be in the linear region.

The compensation circuit may generate a first regression curve and a first equation with respect to the first regression curve, the first regression curve being generated using the first gate voltage, the second gate voltage, the third gate voltage, the first drain current at the first time point, the second drain current at the first time point, and the third drain current at the first time point, and generate a second regression curve and a second equation with respect to the second regression curve, the second regression curve being generated using the first gate voltage, the second gate voltage, the third gate voltage, the first drain current at the second time point, the second drain current at the second time point, and the third drain current at the second time point.

The compensation circuit may calculate a distance between the first regression curve and the second regression curve using the first equation and the second equation, and calculate the change amount of the gate voltage based on the distance.

The compensation circuit may apply a compensation voltage, corresponding to the change amount of the gate voltage, to the power supply circuit. The power supply circuit may add the compensation voltage to the gate-off voltage to generate a corrected gate-off voltage.

When the change amount of the gate voltage exceeds a threshold value, the compensation circuit may apply a compensation voltage, corresponding to the change amount of the gate voltage, to the power supply circuit, and the power supply circuit may add the compensation voltage to the gate-off voltage to generate a corrected gate-off voltage.

The first time point may be between an on-time point of the display device and a first frame period.

The second time point may be between the first frame period and an off-time point of the display device.

The different time points may further include a third time point that is delayed in time with respect to the second time point. The third time point may be between the first frame period and the off-time point of the display device. A length in time from a start time point of the first frame period to the third time point may be longer than a length in time from the start time point of the first frame period to the second time point.

The gate-off voltage from the power supply circuit may be further applied to the dummy gate line.

The pixel electrode and the switching element may be disposed at a display area of the substrate. The dummy pixel electrode and the dummy switching element may be disposed at a non-display area of the substrate.

The display device may further include a first data driving integrated circuit connected to the data line.

The compensation circuit may be embedded in the first data driving integrated circuit.

The display device may further include a second data driving integrated circuit connected to another data line which is adjacent to the data line.

The display device may further include: a first link line connected to the data line and the first data driving integrated circuit; and a second link line connected to the another data line and the second data driving integrated circuit. The compensation circuit may be disposed between the first link line and the second link line at the non-display area of the substrate.

Each of the switching element and the dummy switching element may include a channel area having a substantially equal size and a substantially identical shape.

According to an exemplary embodiment of the inventive concept, a display device includes: a substrate; a gate line, a dummy gate line, a data line, a dummy data line, a pixel electrode, and a dummy pixel electrode, each disposed on the substrate; a switching element connected to the gate line, the data line, and the pixel electrode; a dummy switching element connected to the dummy gate line, the dummy data line, and the dummy pixel electrode; a compensation circuit sequentially applying a plurality of compensation voltages having different values to the dummy gate line, sequentially receiving a plurality of drain currents generated by the plurality of compensation voltages through the dummy pixel, and selecting a compensation voltage corresponding to a drain current having a smallest value among the plurality of drain currents applied to the compensation circuit; a power supply circuit outputting the compensation voltage selected by the compensation circuit as a gate-off voltage; and a gate driver applying the gate-off voltage from the power supply circuit to the gate line.

The plurality of compensation voltages may have an arithmetic progression relationship.

According to an exemplary embodiment of the inventive concept, a method of operating a display device including a compensation circuit and a power supply circuit includes determining whether a driving time of the display device is greater than or equal to a start time point of a first frame period, applying, by the compensation circuit, a compensation voltage to the power supply circuit if the driving time is not greater than or equal to the start time point, determining whether the driving time is greater than or equal to a first time, where the first time is a time length between the start t point and a first detection time point, determining whether a change amount of a dummy gate voltage is greater than a threshold value if the driving time is greater than or equal to the first time, applying, by the compensation circuit, the compensation voltage to the power supply circuit if the change amount is greater than the threshold value, determining whether the driving time is greater than or equal to a second time, where the second time is greater than the first time, and applying, by the compensation circuit, the compensation voltage to the power supply circuit if the driving time is greater than or equal to the second time.

BRIEF DESCRIPTION OF THE DRAWINGS

The above and other features of the inventive concept will become more apparent by describing in detail exemplary embodiments thereof with reference to the accompanying drawings.

FIG. 17 is a flowchart illustrating an operation of the compensation portion of FIG. 15 according to an exemplary embodiment of the inventive concept.

DETAILED DESCRIPTION OF THE EMBODIMENTS

Figure 1:
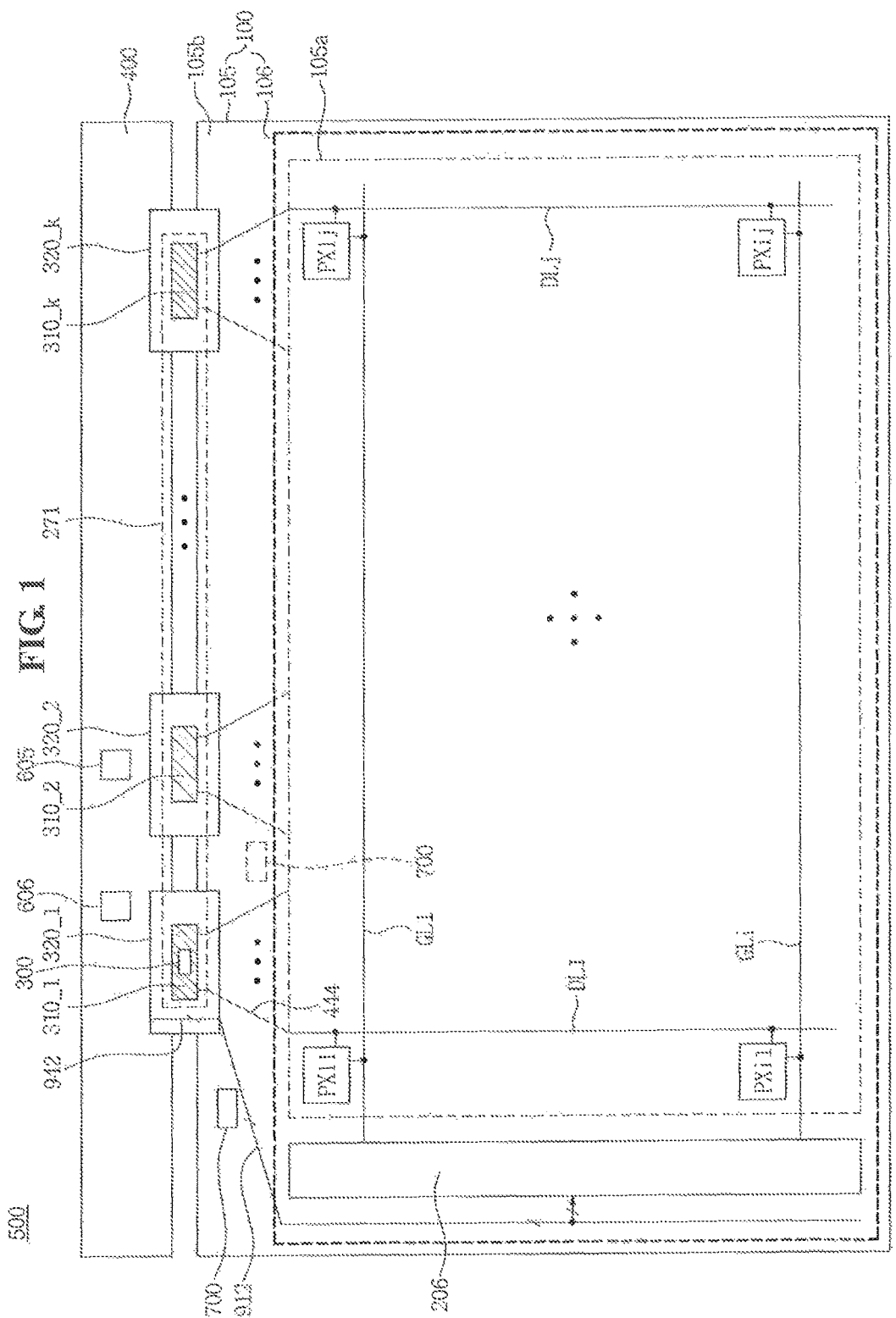
FIG. 1 is a view illustrating a display device according to an exemplary embodiment of the inventive concept.

Exemplary embodiments of the inventive concept are directed to a display device capable of substantially minimizing a leakage current of a switching element.

Exemplary embodiments will now be described more fully hereinafter with reference to the accompanying drawings. Like reference numerals may refer to like elements throughout this application.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further, when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value as well as values within an acceptable range of deviation for the stated value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, or 5% of the stated value.

Hereinafter, a display device according to exemplary embodiments of the inventive concept will be described with reference to FIGS. 1 to 17.

FIG. 1 is a view illustrating a display device according to an exemplary embodiment of the inventive concept.

As illustrated in FIG. 1, a display device 500 according to an exemplary embodiment of the inventive concept includes a display panel 100, a data driver 271, a gate driver 206, a circuit board 400, a timing controller 606, a power supply portion 605, a dummy portion 700, and a compensation portion 300. Hereinafter, "portions" may be circuits in the display device 500. For example, the power supply portion 605, the dummy portion 700, and the compensation portion 300 are a power supply circuit 605, a dummy circuit 700, and a compensation circuit 300, respectively.

The display panel 100 includes a first substrate 105 and a second substrate 106. The first substrate 105 and the second substrate 106 face each other. The first substrate 105 includes a display area 105a and a non-display area 105b.

The display panel 100 may be, for example, a liquid crystal display ("LCD") panel or an organic light emitting diode ("OLED") display panel, which may be used in various types of display devices. When the display panel 100 is an LCD panel, a liquid crystal layer may be disposed between the first substrate 105 and the second substrate 106. When the display panel 100 is an OLED display panel, an organic light emitting layer may be disposed between the first substrate 105 and the second substrate 106.

A plurality of gate lines GL1 to GLi, a plurality of data lines DL1 to DLj, and a plurality of pixels PX11 to PXij are disposed on the first substrate 105.

A light blocking portion which defines a pixel area is disposed on the second substrate 106. In an exemplary embodiment of the inventive concept, the light blocking portion may be disposed at the first substrate 105. The light blocking portion substantially prevents a light from being emitted toward a portion except the pixel area.

The data lines DL1 to DLj cross the gate lines GL1 to GLi. The data lines DL1 to DLj extend to the non-display area 105b to be connected to the data driver 271.

The data driver 271 includes a plurality of data driving integrated circuits ("ICs") 310_1, 310_2, . . . and 310_k. The data driving ICs 310_1, 310_2, . . . and 310_k receive digital image data signals and a data control signal applied from the timing controller 606.

The data driving ICs 310_1, 310_2, . . . and 310_k sample the digital image data signals according to the data control signal, latch the sampled digital image data signals corresponding to one horizontal line in each horizontal period, and apply the latched image data signals to the data lines DL1 to DLj. In other words, the data driving ICs 310_1, 310_2, . . . and 310_k convert the digital image data signals applied from the timing controller 606 into analog image signals using a gamma voltage input from the power supply portion 605 and apply the converted analog image signals to the data lines DL1 to DLj.

The data driving ICs 310_1, 310_2, . . . and 310_k are mounted on data carriers 320_1, 320_2, . . ., and 320_k, respectively. The data carriers 320_1, 320_2, . . . , and 320_k are connected between the circuit board 400 and the first substrate 105. For example, each of the data carriers 320_1, 320_2, . . . , and 320_k may be electrically connected between the circuit board 400 and the non-display area 105b of the first substrate 105.

Each of the data driving ICs 310_1, 310_2, . . . and 310_k is connected to the data lines DL1 to DLj through link lines 444 (also called fan-out lines). For example, the data driving IC 310_1 is connected to the data line DL1 through the link line 444.

The timing controller 606 and the power supply portion 605 described above may be disposed on the circuit board 400.

The data carriers 320_1, 320_2, . . . , and 320_k include input lines for transmitting various signals applied from the timing controller 606 and the power supply portion 605 to the data driving ICs 310_1, 310_2, . . . and 310_k and output lines for transmitting image data signals output from the data driving ICs 310_1, 310_2, . . . and 310_k to the corresponding ones of the data lines DL1 to DLj.

A data carrier at a leftmost edge, e.g., the data carrier 320_1, may include an auxiliary line 942 for transmitting various signals and a common voltage applied from the timing controller 606 and the power supply portion 605 to the first substrate 105. The auxiliary line 942 may be connected to the gate driver 206 through a panel line 912 of the first substrate 105.

The pixels PX11 to PXij are arranged in a matrix in the display area 105a of the first substrate 105. The pixels PX11 to PXij include a red pixel for displaying a red image, a green pixel for displaying a green image, and a blue pixel for displaying a blue image. In the present exemplary embodiment, a red pixel, a green pixel, and a blue pixel adjacent to one another in a horizontal direction may constitute a unit pixel for displaying one unit image.

There are "j" number of pixels arranged along a p-th (p being one selected from 1 to i) horizontal line (hereinafter, p-th horizontal line pixels), which are connected to the first to j-th data lines DL1 to DLj, respectively. In addition, the p-th horizontal line pixels are connected to a p-th gate line in common. Accordingly, the p-th horizontal line pixels receive a p-th gate signal as a common signal. In other words, "j" number of pixels in a substantially same horizontal line receive a same gate signal, while pixels in different horizontal lines receive different gate signals Each pixel may include a switching element, a liquid crystal capacitor, and a storage capacitor. The switching element is a thin film transistor.

The switching element is turned on according to a gate signal applied from a corresponding gate line. The switching element which is turned on applies the analog image data signal provided from a corresponding data line to the liquid crystal capacitor and the storage capacitor.

The gate lines GL1 to GLi are driven by the gate driver 206, and the gate driver 206 may include a shift register.

The gate driver 206 may be disposed at the non-display area 105b of the first substrate 105, as illustrated in FIG. 1. Alternatively, the gate driver 206 may be connected to the non-display area 105b of the first substrate 105 in the form of an IC with the data driver 271.

The dummy portion 700 may be disposed at the non-display area 105b of the first substrate 105. For example, the dummy portion 700 may be disposed adjacent to the panel line 912 as shown in FIG. 1. In addition, the dummy portion 700 may be disposed between the panel line 912 and the link line 444 connected to the data line DL. In addition, the dummy portion 700 may be disposed between link lines 444 connected to two adjacent ones of the data driving ICs 310_1, 310_2, . . . and 310_k. For example, when a leftmost data driving IC 310_1 of the data driving ICs is referred to as a first data driving IC and a data driving IC 310_2 adjacent to the first data driving IC 310_1 is referred to as a second data driving IC, the dummy portion 700 may be disposed between one link line (hereinafter, a first link line) connected to the first data driving IC 310_1 and one link line (hereinafter, a second link line) connected to the second data driving IC 310_2. In the present exemplary embodiment, the first link line is a link line closest to the second data driving IC 310_2 of link lines connected to the first data driving IC 310_1, and the second link line is a link line closest to the first data driving IC 310_1 of link lines connected to the second data driving IC 310_2.

The compensation portion 300 is connected to the dummy portion 700 and the power supply portion 605. The compensation portion 300 determines a compensation voltage based on a signal detected from the dummy portion 700, and applies the compensation voltage to the power supply portion 605. The compensation portion 300 may be embedded in the data driver 271. For example, the compensation portion 300 may be embedded in the leftmost data driving IC 310_1. In an exemplary embodiment of the inventive concept, the compensation portion 300 may be a part of the data driving IC 310_1. In this case, the data driving IC 310_1 may further serve a function of the compensation portion 300 in addition to the functions described above.

Figure 2:
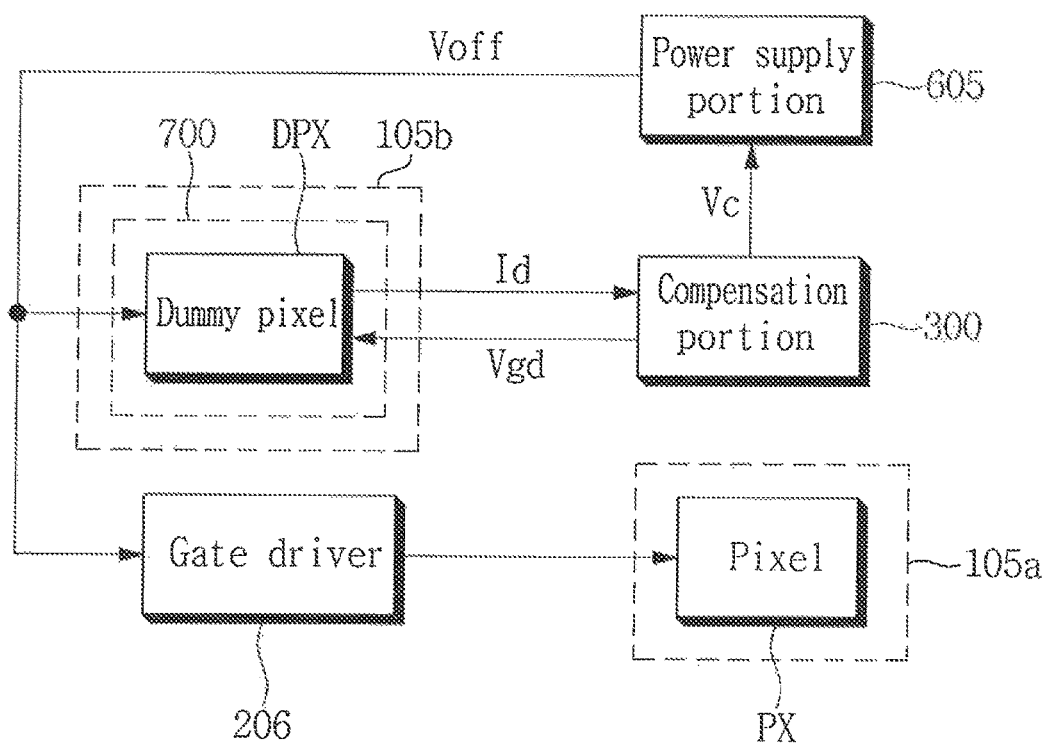
FIG. 2 is an explanatory block diagram illustrating a connection relationship between a dummy portion, a compensation portion, a power supply portion, a gate driver, and a pixel of FIG. 1 according to an exemplary embodiment of the inventive concept.
Figure 3:
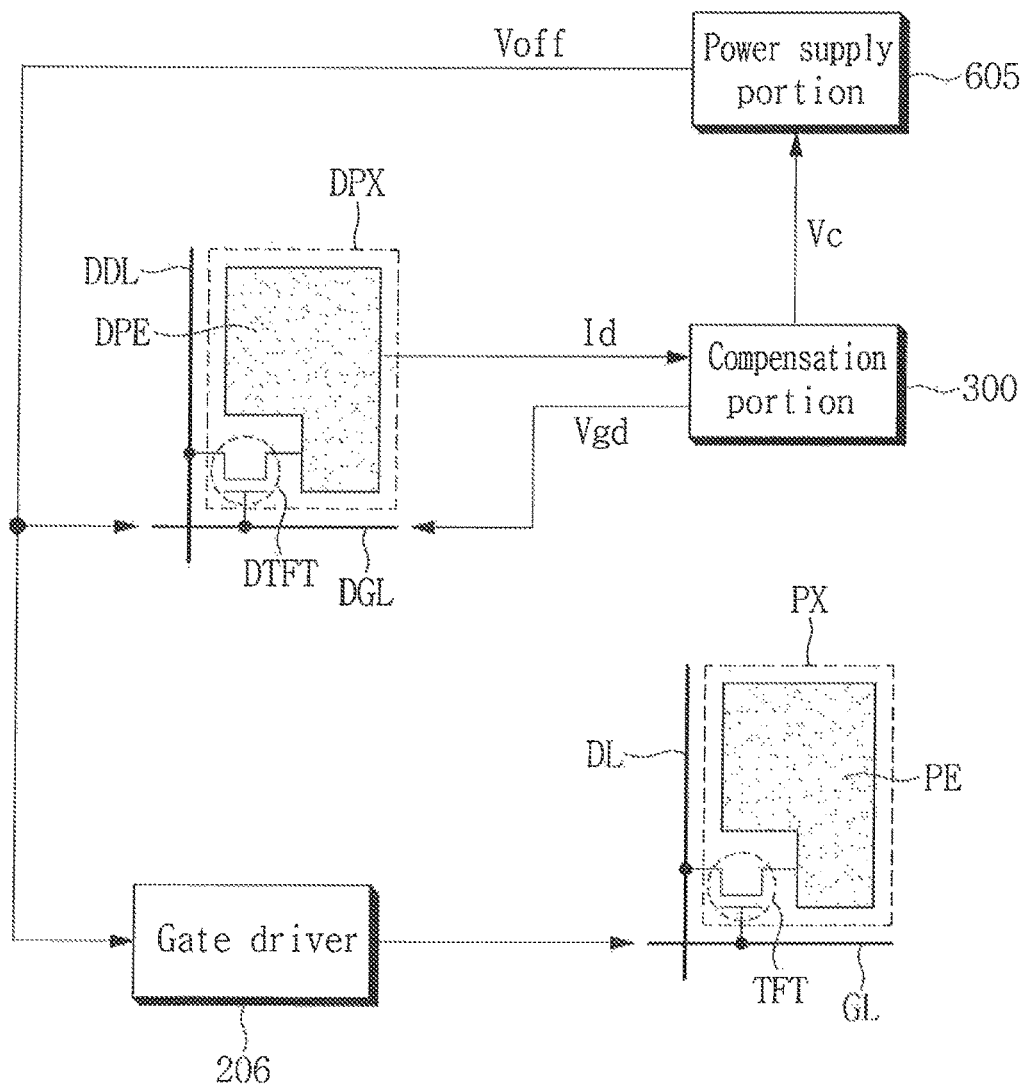
FIG. 3 is a view illustrating a specific configuration of a dummy pixel and the pixel of FIG. 2 according to an exemplary embodiment of the inventive concept.

FIG. 2 is an explanatory block diagram illustrating a connection relationship between a dummy portion, a compensation portion, a power supply portion, a gate driver, and a pixel of FIG. 1 according to an exemplary embodiment of the inventive concept, and FIG. 3 is a view illustrating a specific configuration of a dummy pixel and the pixel of FIG. 2 according to an exemplary embodiment of the inventive concept.

As illustrated in FIG. 2, the dummy portion 700 includes a dummy pixel DPX. The dummy pixel DPX is disposed at the non-display area 105b of the first substrate 105. The dummy pixel DPX is a pixel for determining a degree of deterioration of the pixel PX disposed at the display area 105a. To this end, the dummy pixel DPX may have a configuration substantially the same as that of the pixel PX. For example, as illustrated in FIG. 3, the dummy pixel DPX may include a dummy switching element DTFT and a dummy pixel electrode DPE, and the dummy switching element DTFT of the dummy pixel DPX and the switching element TFT of the pixel PX may have a substantially equal size and a substantially identical shape. For example, a channel area of the dummy switching element DTFT and a channel area of the switching element TFT may have a substantially equal size and a substantially identical shape. As an example, a width and a length of the channel area of the dummy switching element DTFT may be substantially equal to a width and a length of the channel area of the switching element TFT. In addition, the dummy switching element DTFT and the switching element TFT may have a substantially equal threshold voltage.

As illustrated in FIG. 3, a gate electrode of the dummy switching element DTFT is connected to a dummy gate line DGL. In addition, one of a source electrode and a drain electrode of the dummy switching element DTFT is connected to a dummy data line DDL, and the other of the source electrode and the drain electrode is connected to the dummy pixel electrode DPE. For example, the source electrode of the dummy switching element DTFT is connected to the dummy data line DDL, and the drain electrode of the dummy switching element DTFT is connected to the dummy pixel electrode DPE.

A gate electrode of the switching element TFT is connected to a gate line GL. In addition, one of a source electrode and a drain electrode of the switching element TFT is connected to a data line DL, and the other of the source electrode and the drain electrode is connected to a pixel electrode PE. For example, the source electrode of the switching element TFT is connected to the data line DL, and the drain electrode of the switching element TFT is connected to the pixel electrode PE.

The compensation portion 300 detects a change amount of a drain current based on the drain current (e.g., a dummy drain current Id) generated from the dummy pixel DPX at different time points and, based on the change amount of the drain current, detects a change amount of a gate voltage (e.g., a dummy gate voltage Vgd) of the dummy switching element DTFT based on the change amount of the drain current. In the present exemplary embodiment, the compensation portion 300 outputs a compensation voltage Vc corresponding to the change amount of the detected gate voltage.

The aforementioned change amount of the dummy gate voltage Vgd refers to a change amount of the dummy gate voltage Vgd in a linear region including the threshold voltage of the dummy switching element DTFT. The dummy drain current Id of the dummy switching element DTFT refers to a current flowing through the source electrode and the drain electrode of the dummy switching element DTFT. In addition, the dummy gate voltage Vgd of the dummy switching element DTFT refers to a voltage applied to the gate electrode of the dummy switching element DTFT. The dummy gate voltage Vgd corresponds to a turn-off voltage of the dummy switching element DTFT. Accordingly, the aforementioned dummy drain current Id may be a leakage current of the dummy switching element DTFT.

The power supply portion 605 outputs a gate-off voltage Voff which is a DC voltage. As such, the power supply portion 605 corrects the gate-off voltage Voff based on the change amount of the dummy gate voltage Vgd detected by the compensation portion 300. In other words, the power supply portion 605 receives the compensation voltage Vc from the compensation portion 300 and adds the compensation voltage Vc to the gate-off voltage Voff to obtain a corrected gate-off voltage Voff. The gate-off voltage Voff output from the power supply portion 605 is applied to the dummy pixel DPX. For example, the gate-off voltage Voff applied from the power supply portion 605 is applied to the dummy gate line DGL connected to the dummy pixel DPX. The dummy switching element DTFT may be turned off by the gate-off voltage Voff.

In addition, the gate-off voltage Voff output from the power supply portion 605 is also applied to the gate driver 206. The gate driver 206 applies the gate-off voltage Voff applied from the power supply portion 605 to the pixel PX. For example, the gate-off voltage Voff from the gate driver 206 is applied to the gate line GL, e.g., one of the gate lines GL1 to GLi, connected to the pixel PX. The switching element TFT may be turned off by the gate-off voltage Voff. The aforementioned gate signal and the gate-off voltage Voff are applied to the gate line GL, and the switching element TFT is turned on by the gate signal but turned off by the gate-off voltage Voff. During a period corresponding to about 10% of one frame period, the gate signal may be held in the gate line GL, and during a period corresponding to about 90% of the one frame period, the gate-off voltage Voff may be held in the gate line GL.

Figure 4:
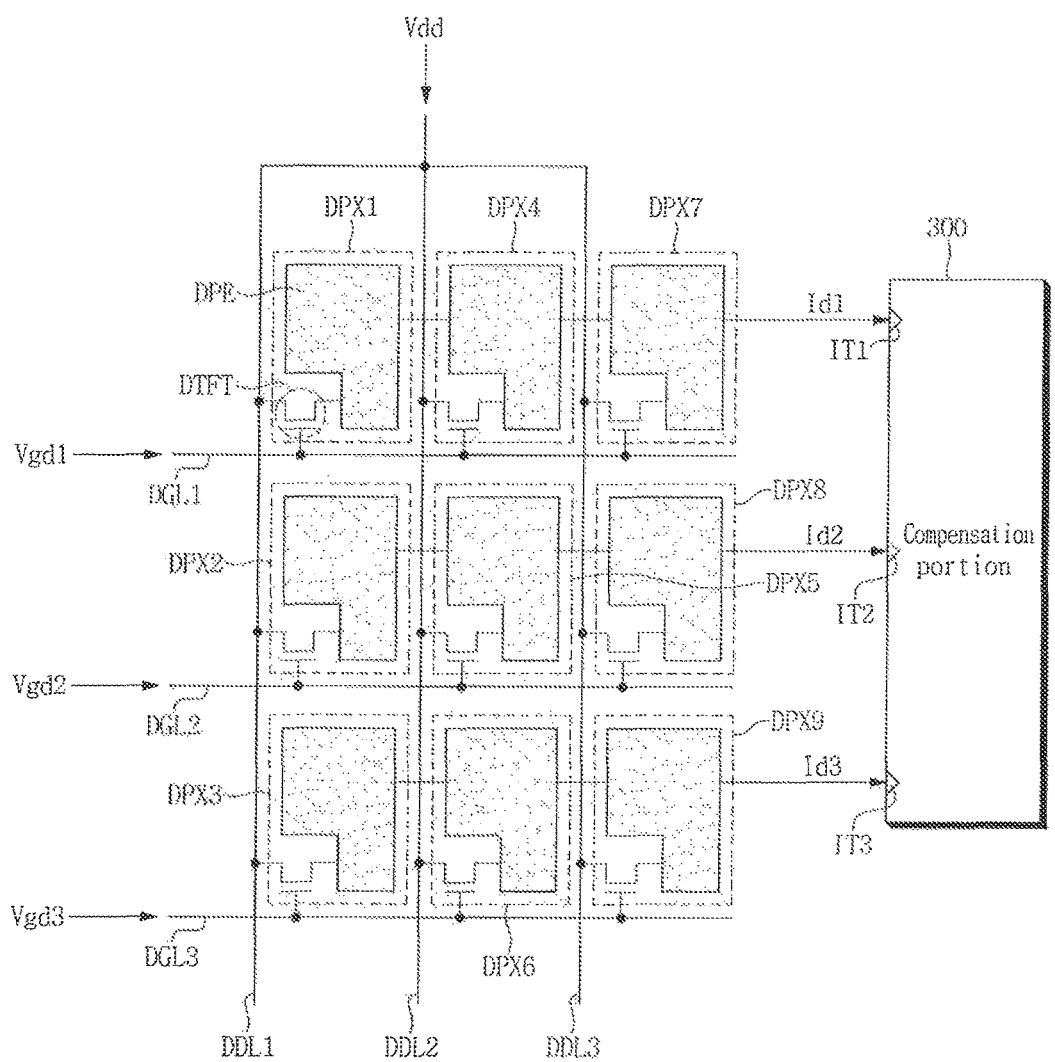
FIG. 4 is a view illustrating the dummy portion of FIG. 1 according to an exemplary embodiment of the inventive concept.

FIG. 4 is a view illustrating the dummy portion of FIG. 1 according to an exemplary embodiment of the inventive concept.

As illustrated in FIG. 4, the dummy portion 700 may include a plurality of dummy pixels DPX1, DPX2, DPX3, DPX3, DPX4, DPXS, DPX6, DPX7, DPX8, and DPX9. Herein, the dummy pixel DPX1 connected to a first dummy gate line DGL1 and a first dummy data line DDL1 is referred to as a first dummy pixel, the dummy pixel DPX2 connected to a second dummy gate line DGL2 and the first dummy data line DDL1 is referred to as a second dummy pixel, the dummy pixel DPX3 connected to a third dummy gate line DGL3 and the first dummy data line DDL1 is referred to as a third dummy pixel, the dummy pixel DPX4 connected to the first dummy gate line DGL1 and a second dummy data line DDL2 is referred to as a fourth dummy pixel, the dummy pixel DPX5 connected to the second dummy gate line DGL2 and the second dummy data line DDL2 is referred to as a fifth dummy pixel, the dummy pixel DPX6 connected to the third dummy gate line DGL3 and the second dummy data line DDL2 is referred to as a sixth dummy pixel, the dummy pixel DPX7 connected to the first dummy gate line DGL1 and a third dummy data line DDL3 is referred to as a seventh dummy pixel, the dummy pixel DPX8 connected to the second dummy gate line DGL2 and the third dummy data line DDL3 is referred to as an eighth dummy pixel, and the dummy pixel DPX9 connected to the third dummy gate line DGL3 and the third dummy data line DDL3 is referred to as a ninth dummy pixel.

Each of the dummy pixels DPX1, DPX2, DPX3, DPX4, DPX5, DPX6, DPX7, DPX8, and DPX9 includes the dummy switching element DTFT and the dummy pixel electrode DPE. In this case, the dummy switching element DTFT and the dummy pixel electrode DPE of the first dummy pixel DPX1 are referred to as a first dummy switching element and a first dummy pixel electrode, respectively, the dummy switching element DTFT and the dummy pixel electrode DPE of the second dummy pixel DPX2 are referred to as a second dummy switching element and a second dummy pixel electrode, respectively, the dummy switching element DTFT and the dummy pixel electrode DPE of the third dummy pixel DPX3 are referred to as a third dummy switching element and a third dummy pixel electrode, respectively, the dummy switching element DTFT and the dummy pixel electrode DPE of the fourth dummy pixel DPX4 are referred to as a fourth dummy switching element and a fourth dummy pixel electrode, respectively, the dummy switching element DTFT and the dummy pixel electrode DPE of the fifth dummy pixel DPX5 are referred to as a fifth dummy switching element and a fifth dummy pixel electrode, respectively, the dummy switching element DTFT and the dummy pixel electrode DPE of the sixth dummy pixel DPX6 are referred to as a sixth dummy switching element and a sixth dummy pixel electrode, respectively, the dummy switching element DTFT and the dummy pixel electrode DPE of the seventh dummy pixel DPX7 are referred to as a seventh dummy switching element and a seventh dummy pixel electrode, respectively, the dummy switching element DTFT and the dummy pixel electrode DPE of the eighth dummy pixel DPX8 are referred to as an eighth dummy switching element and an eighth dummy pixel electrode, respectively, and the dummy switching element DTFT and the dummy pixel electrode DPE of the ninth dummy pixel DPX9 are referred to as a ninth dummy switching element and a ninth dummy pixel electrode, respectively.

The first dummy switching element of the first dummy pixel DPX1 is connected to the first dummy gate line DGL1, the first dummy data line DDL1, and the first dummy pixel electrode. For example, a gate electrode of the first dummy switching element is connected to the first dummy gate line DGL1, a source electrode of the first dummy switching element is connected to the first dummy data line DDL1, and a drain electrode of the first dummy switching element is connected to the first dummy pixel electrode.

The second dummy switching element of the second dummy pixel DPX2 is connected to the second dummy gate line DGL2, the first dummy data line DDL1, and the second dummy pixel electrode. For example, a gate electrode of the second dummy switching element is connected to the second dummy gate line DGL2, a source electrode of the second dummy switching element is connected to the first dummy data line DDL1, and a drain electrode of the second dummy switching element is connected to the second dummy pixel electrode.

The third dummy switching element of the third dummy pixel DPX3 is connected to the third dummy gate line DGL3, the first dummy data line DDL1, and the third dummy pixel electrode. For example, a gate electrode of the third dummy switching element is connected to the third dummy gate line DGL3, a source electrode of the third dummy switching element is connected to the first dummy data line DDL1, and a drain electrode of the third dummy switching element is connected to the third dummy pixel electrode.

The fourth dummy switching element of the fourth dummy pixel DPX4 is connected to the first dummy gate line DGL1, the second dummy data line DDL2, and the fourth dummy pixel electrode. For example, a gate electrode of the fourth dummy switching element is connected to the first dummy gate line DGL1, a source electrode of the fourth dummy switching element is connected to the second dummy data line DDL2, and a drain electrode of the fourth dummy switching element is connected to the fourth dummy pixel electrode.

The fifth dummy switching element of the fifth dummy pixel DPXS is connected to the second dummy gate line DGL2, the second dummy data line DDL2, and the fifth dummy pixel electrode. For example, a gate electrode of the fifth dummy switching element is connected to the second dummy gate line DGL2, a source electrode of the fifth dummy switching element is connected to the second dummy data line DDL2, and a drain electrode of the fifth dummy switching element is connected to the fifth dummy pixel electrode.

The sixth dummy switching element of the sixth dummy pixel DPX6 is connected to the third dummy gate line DGL3, the second dummy data line DDL2 and the sixth dummy pixel electrode. For example, a gate electrode of the sixth dummy switching element is connected to the third dummy gate line DGL3, a source electrode of the sixth dummy switching element is connected to the second dummy data line DDL2, and a drain electrode of the sixth dummy switching element is connected to the sixth dummy pixel electrode.

The seventh dummy switching element of the seventh dummy pixel DPX7 is connected to the first dummy gate line DGL1, the third dummy data line DDL3 and the seventh dummy pixel electrode. For example, a gate electrode of the seventh dummy switching element is connected to the first dummy gate line DGL1, a source electrode of the seventh dummy switching element is connected to the third dummy data line DDL3, and a drain electrode of the seventh dummy switching element is connected to the seventh dummy pixel electrode.

The eighth dummy switching element of the eighth dummy pixel DPX8 is connected to the second dummy gate line DGL2, the third dummy data line DDL3 and the eighth dummy pixel electrode. For example, a gate electrode of the eighth dummy switching element is connected to the second dummy gate line DGL2, a source electrode of the eighth dummy switching element is connected to the third dummy data line DDL3, and a drain electrode of the eighth dummy switching element is connected to the eighth dummy pixel electrode.

The ninth dummy switching element of the ninth dummy pixel DPX9 is connected to the third dummy gate line DGL3, the third dummy data line DDL3, and the ninth dummy pixel electrode. For example, a gate electrode of the ninth dummy switching element is connected to the third dummy gate line DGL3, a source electrode of the ninth dummy switching element is connected to the third dummy data line DDL3, and a drain electrode of the ninth dummy switching element is connected to the ninth dummy pixel electrode.

Pixel electrodes included in dummy pixels connected in common to one dummy gate line may be connected to one another. For example, the first dummy pixel electrode, the fourth dummy pixel electrode, and the seventh dummy pixel electrode included in the first dummy pixel DPX1, the fourth dummy pixel DPX4, and the seventh dummy pixel DPX7, respectively, which are connected in common to the first dummy gate line DGL1, may be physically connected to one another. In other words, the first dummy pixel electrode, the fourth dummy pixel electrode, and the seventh dummy pixel electrode may be unitary. In addition, the second dummy pixel electrode, the fifth dummy pixel electrode, and the eighth dummy pixel electrode included in the second dummy pixel DPX2, the fifth dummy pixel DPX5, and the eighth dummy pixel DPX8, respectively, which are connected in common to the second dummy gate line DGL2, may be physically connected to one another. In other words, the second dummy pixel electrode, the fifth dummy pixel electrode, and the eighth dummy pixel electrode may be unitary. In addition, the third dummy pixel electrode, the sixth dummy pixel electrode, and the ninth dummy pixel electrode included in the third dummy pixel DPX3, the sixth dummy pixel DPX6, and the ninth dummy pixel DPX9, respectively, which are connected in common to the third dummy gate line DGL3, may be physically connected to one another. In other words, the third dummy pixel electrode, the sixth dummy pixel electrode, and the ninth dummy pixel electrode may be unitary.

The first dummy pixel electrode, the fourth dummy pixel electrode, and the seventh dummy pixel electrode which are unitary are referred to as a first common pixel electrode, and the first common pixel electrode is connected to the compensation portion 300. For example, the first common pixel electrode may be connected to a first input terminal IT1 of the compensation portion 300. In addition, the second dummy pixel electrode, the fifth dummy pixel electrode, and the eighth dummy pixel electrode which are unitary are referred to as a second common pixel electrode, and the second common pixel electrode is connected to the compensation portion 300. For example, the second common pixel electrode may be connected to a second input terminal IT2 of the compensation portion 300. The third dummy pixel electrode, the sixth dummy pixel electrode, and the ninth dummy pixel electrode which are unitary are referred to as a third common pixel electrode, and the third common pixel electrode is connected to the compensation portion 300. For example, the third common pixel electrode may be connected to a third input terminal IT3 of the compensation portion 300.

A current (a leakage current) flowing through the first dummy switching element, a current (a leakage current) flowing through the fourth dummy switching element, and a current (a leakage current) flowing through the seventh dummy switching element are combined through the first common pixel electrode to be input to the first input terminal IT1. The combined current (a leakage current; hereinafter, a first dummy drain current Id1) is applied to the compensation portion 300 through the first input terminal IT1.

A current (a leakage current) flowing through the second dummy switching element, a current (a leakage current) flowing through the fifth dummy switching element, and a current (a leakage current) flowing through the eighth dummy switching element are combined through the second common pixel electrode to be input to the second input terminal IT2. The combined current (a leakage current; hereinafter, a second dummy drain current Id2) is applied to the compensation portion 300 through the second input terminal IT2.

A current (a leakage current) flowing through the third dummy switching element, a current (a leakage current) flowing through the sixth dummy switching element, and a current (a leakage current) flowing through the ninth dummy switching element are combined through the third common pixel electrode to be input to the third input terminal IT3. The combined current (a leakage current; hereinafter, a third dummy drain current Id3) is applied to the compensation portion 300 through the third input terminal IT3.

The first, second, and third dummy gate lines DGL1, DGL2, and DGL3 are physically separated from one another. Each of the first, second, and third dummy gate lines DGL1, DGL2, and DGL3 receives a dummy gate voltage. In other words, the first dummy gate line DGL1 receives a first dummy gate voltage Vgd1, the second dummy gate line DGL2 receives a second dummy gate voltage Vgd2, and the third dummy gate line DGL3 receives a third dummy gate voltage Vgd3.

Each of the first dummy gate voltage Vgd1, the second dummy gate voltage Vgd2, and the third dummy gate voltage Vgd3 is a DC voltage and is a voltage (e.g., a gate voltage) in a linear region A in an I-V characteristic curve of the dummy switching element DTFT. The linear region A is a region including the threshold voltage of the dummy switching element DTFT.

The first dummy gate voltage Vgd1, the second dummy gate voltage Vgd2, and the third dummy gate voltage Vgd3 may have different values from one another. In addition, a difference between the first dummy gate voltage Vgd1 and the second dummy gate voltage Vgd2 may be substantially equal to a difference between the second dummy gate voltage Vgd2 and the third dummy gate voltage Vgd3. For example, the first dummy gate voltage Vgd1 may have a value of about −3 V, the second dummy gate voltage Vgd2 may have a value of about 0 V, and the third dummy gate voltage Vgd2 may have a value of about +3 V.

The first dummy gate voltage Vgd1, the second dummy gate voltage Vgd2, and the third dummy gate voltage Vgd3 may be generated from one of the power supply portion 605, the data driving ICs (one of the data driving ICs 310_1 to 310_k), and the compensation portion 300. In other words, the dummy gate voltages Vgd1, Vgd2, and Vgd3 may be supplied or output from one of the power supply portion 605, the data driving ICs (one of the data driving ICs 310_1 to 310_k), and the compensation portion 300. In an exemplary embodiment of the inventive concept, the dummy gate voltages Vgd1, Vgd2, and Vgd3 are stored in the compensation portion 300 irrespective of sources of the dummy gate voltages Vgd1, Vgd2, and Vgd3.

In addition, each of the first dummy gate line DGL1, the second dummy gate line DGL2, and the third dummy gate line DGL3 may receive the gate-off voltage Voff. For example, in a period (hereinafter, a non-detection period) excluding a detection time point (or a detection period) at which the first dummy gate voltage Vgd1, the second dummy gate voltage Vgd2, and the third dummy gate voltage Vgd3 are applied to the corresponding dummy gate lines DGL, the gate-off voltage Voff is applied to the dummy gate lines DGL. In other words, the gate-off voltage Voff is applied to each of the first dummy gate line DGL1, the second dummy gate line DGL2, and the third dummy gate line DGL3 during the non-detection period. The gate-off voltage Voff is substantially equal to the gate-off voltage Voff applied to the gate line GL.

The first dummy data line DDL1, the second dummy data line DDL2 and the third dummy data line DDL3 receive a dummy data voltage Vdd. In other words, the dummy data lines DDL1, DDL2, and DDL3 all receive a same dummy data voltage Vdd. Accordingly, the dummy data lines DDL1, DDL2, and DDL3 are connected to one another.

The dummy data voltage Vdd is a DC voltage, and may be generated from one of the power supply portion 605, the data driving ICs (one of the data driving ICs 310_1 to 310_k), and the compensation portion 300. In other words, the dummy data voltage Vdd may be applied or output from one of the power supply portion 605, the data driving ICs (one of the data driving ICs 310_1 to 310_k), and the compensation portion 300.

In an exemplary embodiment of the inventive concept, the fourth, fifth, sixth, seventh, eighth, and ninth dummy pixels DPX4, DPXS, DPX6, DPX7, DPX8, and DPX9 of the first, second, third, fourth, fifth, sixth, seventh, eighth, and ninth dummy pixels DPX1, DPX2, DPX3, DPX4, DPXS, DPX6, DPX7, DPX8, and DPX9 may be removed. The second and third dummy data lines DDL2 and DDL3 may also be removed. In this case, the dummy portion 700 includes the first, second, and third dummy pixels DPX1, DPX2, and DPX3.

In addition, the number of dummy pixels connected in common to the first dummy gate line DGL1 may be more than three. Similarly, the number of dummy pixels connected in common to the second dummy gate line DGL2 may be more than three, and the number of dummy pixels connected in common to the third dummy gate line DGL3 may be more than three. As the number of dummy pixels connected to each dummy gate line increases, even a small leakage current may be easily detected.

Figure 5:
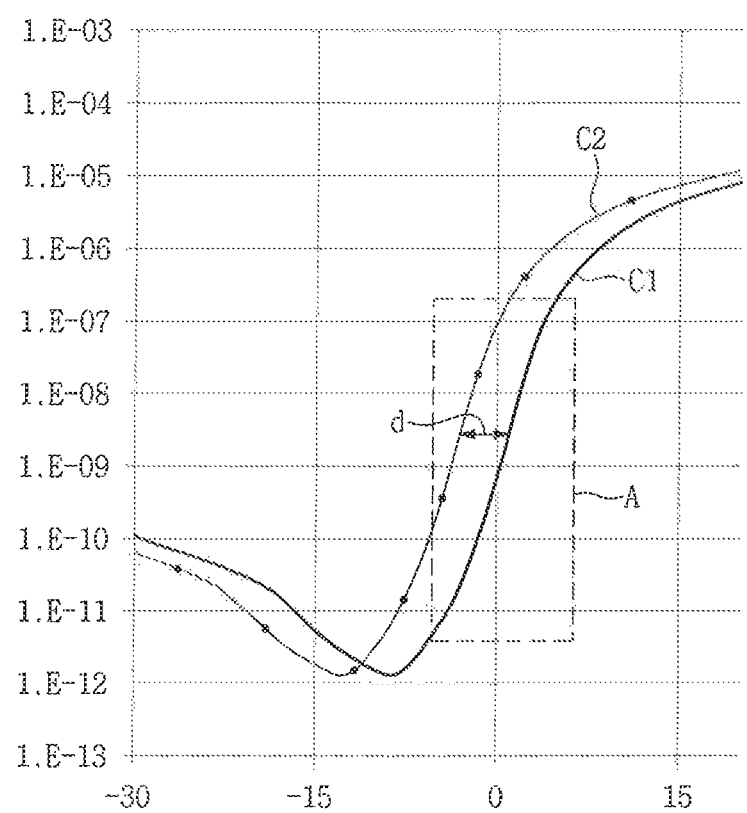
FIG. 5 is a graph illustrating an I-V characteristic curve according to a driving time of one of dummy switching elements of FIG. 4 according to an exemplary embodiment of the inventive concept.

FIG. 5 is a graph illustrating an I-V characteristic curve according to a driving time of one of dummy switching elements of FIG. 4 according to an exemplary embodiment of the inventive concept.

FIG. 5 shows two I-V characteristic curves for one dummy switching element DTFT, which are referred to as a first curve C1 and a second curve C2, respectively. In FIG. 5, an X-axis represents a gate voltage (a dummy gate voltage) applied to the gate electrode of the dummy switching element DTFT, and a Y-axis represents a dummy drain current generated at the drain electrode of the dummy switching element DTFT.

For example, the dummy switching element DTFT may initially exhibit characteristics as illustrated in the first curve C1. When a driving time of the dummy switching element DTFT elapses, the dummy switching element DTFT may exhibit characteristics as illustrated in the second curve C2. In other words, as the driving time increases, the dummy switching element DTFT may be deteriorated and the threshold voltage of the dummy switching element DTFT shifts in a negative direction. The reason why the threshold voltage of the dummy switching element DTFT shifts in the negative direction is because the gate-off voltage Voff, which is a negative voltage, is applied to the gate electrode of the dummy switching element DTFT during most of one frame period.

There is a region, e.g., the linear region A, in the first curve C1 of the dummy switching element DTFT where the dummy drain current increases in proportion to the dummy gate voltage. For example, there is the linear region A including the aforementioned threshold voltage in the first curve C1 of the logarithmic scale. Similarly, there is a region, e.g., the linear region A, in the second curve C2 of the dummy switching element DTFT where the dummy drain current increases in proportion to the dummy gate voltage. For example, there is the linear region A including the aforementioned threshold voltage in the second curve C2 of the logarithmic scale.

A distance d between the first curve C1 and the second curve C2 in the X-axis direction indicates a change amount of the dummy gate voltage. The change amount of the dummy gate voltage is the aforementioned compensation voltage Vc. The change amount of the dummy gate voltage mainly has a negative direction. Thus, the compensation voltage Vc has a negative value. However, the change amount of the dummy gate voltage may have a positive direction. In other words, although the driving time of the dummy switching element DTFT increases, the change amount of the dummy gate voltage may have a positive direction. In this case, the compensation voltage Vc has a positive value.

The compensation portion 300 calculates a regression curve (hereinafter, a first regression curve Cr1) and an equation (hereinafter, a first equation) for the first regression curve Cr1 with respect to the linear region A of the first curve C1 based on the first dummy gate voltage Vgd1, the second dummy gate voltage Vgd2, the third dummy gate voltage Vgd3, the first dummy drain current Id1, the second dummy drain current Id2, and the third dummy drain current Id3 at a predetermined first detection time point (or a first compensation period).

In addition, after a predetermined driving time, the compensation portion 300 calculates a regression curve (hereinafter, a second regression curve Cr2) and an equation (hereinafter, a second equation) for the second regression curve Cr2 with respect to the linear region A of the second curve C2 based on the first dummy gate voltage Vgd1, the second dummy gate voltage Vgd2, the third dummy gate voltage Vgd3, the first dummy drain current Id1, the second dummy drain current Id2, and the third dummy drain current Id3 at a predetermined second detection time point (or a second compensation period). The second detection time point (or the second compensation period) may be later in time than the first detection time point (or the first compensation period).

In an exemplary embodiment of the inventive concept, the first dummy drain current Id1, the second dummy drain current Id2, and the third dummy drain current Id3 at the first detection time point have values different from values of the first dummy drain current Id1, the second dummy drain current Id2, and the third dummy drain current Id3 at the second detection time point. In other words, the first dummy drain current Id1 at the first detection time point has a value different from a value of the first dummy drain current Id1 at the second detection time point, the second dummy drain current Id2 at the first detection time point has a value different from a value of the second dummy drain current Id2 at the second detection time point, and the third dummy drain current Id3 at the first detection time point has a value different from a value of the third dummy drain current Id3 at the second detection time point. Accordingly, as illustrated in FIG. 5, the first curve C1 at the first detection time point and the second curve C2 at the second detection time point represent different dummy drain currents for a substantially same dummy gate voltage.

Figure 6:
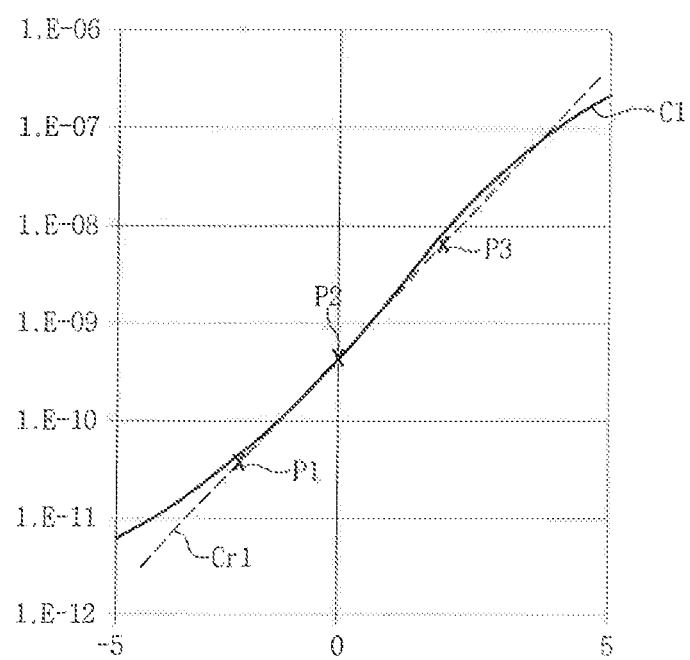
FIG. 6 is a view enlarging a linear region of a first curve illustrated in FIG. 5 according to an exemplary embodiment of the inventive concept.

FIG. 6 is a view enlarging a linear region of a first curve illustrated in FIG. 5 according to an exemplary embodiment of the inventive concept.

The compensation portion 300 generates the first regression curve Cr1 based on the first dummy gate voltage Vgd1, the second dummy gate voltage Vgd2, the third dummy gate voltage Vgd3, the first dummy drain current Id1 at the first detection time point, the second dummy drain current Id2 at the first detection time point, and the third dummy drain current Id3 at the first detection time point, as illustrated in FIG. 6. The first regression curve Cr1 is a curve that passes through at least one of a first point P1, a second point P2, and a third point P3, or is adjacent to these points.

The first dummy drain current Id1 at the first detection time point refers to a dummy drain current flowing through the drain electrode of the dummy switching element DTFT when the first dummy gate voltage Vgd1 is applied to the gate electrode of the dummy switching element DTFT at the first detection time point. For example, the first dummy drain current Id1 at the first detection time point refers to a current (a leakage current) flowing to the first common pixel electrode through the drain electrode of the first dummy switching element, the drain electrode of the fourth dummy switching element, and the drain electrode of the seventh dummy switching element at the first detection time point.

The second dummy drain current Id2 at the first detection time point refers to a dummy drain current flowing through the drain electrode of the dummy switching element DTFT when the second dummy gate voltage Vgd2 is applied to the gate electrode of the dummy switching element DTFT at the first detection time point. For example, the second dummy drain current Id2 at the first detection time point refers to a current (a leakage current) flowing to the second common pixel electrode through the drain electrode of the second dummy switching element, the drain electrode of the fifth dummy switching element, and the drain electrode of the eighth dummy switching element at the first detection time point.

The third dummy drain current Id3 at the first detection time point refers to a dummy drain current flowing through the drain electrode of the dummy switching element DTFT when the third dummy gate voltage Vgd3 is applied to the gate electrode of the dummy switching element DTFT at the first detection time point. For example, the third dummy drain current Id3 at the first detection time point refers to a current (a leakage current) flowing to the third common pixel electrode through the drain electrode of the third dummy switching element, the drain electrode of the sixth dummy switching element, and the drain electrode of the ninth dummy switching element at the first detection time point.

The compensation portion 300 calculates the first equation, e.g., the following Equation 1, based on the first regression curve Cr1, $$y = b * e^{ax1}, \qquad \text{<Equation 1>}$$

where "e" is an irrational number (or a natural logarithm). In other words, the first regression curve Cr1 is an exponential function with base of "e." In Equation 1, each of "a" and "b" is a constant.

In an exemplary embodiment of the inventive concept, a property value "a" calculated from the first regression curve Cr1 with respect to the initial I-V characteristic curve of the dummy switching element DTFT is stored in the display device.

In addition, the compensation portion 300 generates the second regression curve Cr2 based on the first dummy gate voltage Vgd1, the second dummy gate voltage Vgd2, the third dummy gate voltage Vgd3, the first dummy drain current Id1 at the second detection time point, the second dummy drain current Id2 at the second detection time point, and the third dummy drain current Id3 at the second detection time point.

The first dummy drain current Id1 at the second detection time point refers to a dummy drain current flowing through the drain electrode of the dummy switching element DTFT when the first dummy gate voltage Vgd1 is applied to the gate electrode of the dummy switching element DTFT at the second detection time point. For example, the first dummy drain current Id1 at the second detection time point refers to a current (a leakage current) flowing to the first common pixel electrode through the drain electrode of the first dummy switching element, the drain electrode of the fourth dummy switching element, and the drain electrode of the seventh dummy switching element at the second detection time point.

The second dummy drain current Id2 at the second detection time point refers to a dummy drain current flowing through the drain electrode of the dummy switching element DTFT when the second dummy gate voltage Vgd2 is applied to the gate electrode of the dummy switching element DTFT at the second detection time point. For example, the second dummy drain current Id2 at the second detection time point refers to a current (a leakage current) flowing to the second common pixel electrode through the drain electrode of the second dummy switching element, the drain electrode of the fifth dummy switching element, and the drain electrode of the eighth dummy switching element at the second detection time point.

The third dummy drain current Id3 at the second detection time point refers to a dummy drain current flowing through the drain electrode of the dummy switching element DTFT when the third dummy gate voltage Vgd3 is applied to the gate electrode of the dummy switching element DTFT at the second detection time point. For example, the third dummy drain current Id3 at the second detection time point refers to a current (a leakage current) flowing to the third common pixel electrode through the drain electrode of the third dummy switching element, the drain electrode of the sixth dummy switching element, and the drain electrode of the ninth dummy switching element at the second detection time point.

The compensation portion 300 calculates the second equation, e.g., the following Equation 2, based on the second regression curve Cr2, $$y' = b'^{*}e^{ax2},\qquad \text{<Equation 2>}$$

where "e" is an irrational number (or a natural logarithm). In other words, the second regression curve Cr2 is an exponential function with base of "e." In Equation 2, each of "a" and "b'" is a constant.

Assuming that the first curve C1 and the second curve C2 have a substantially identical shape, "a" in the first equation and "a" in the second equation have a same value. In other words, assuming that the second curve C2 has a shape substantially identical to a shape of the first curve C1 and moves along the X-axis direction from the first curve C1, "a" in the first equation and "a" in the second equation have the same value.

Figure 7:
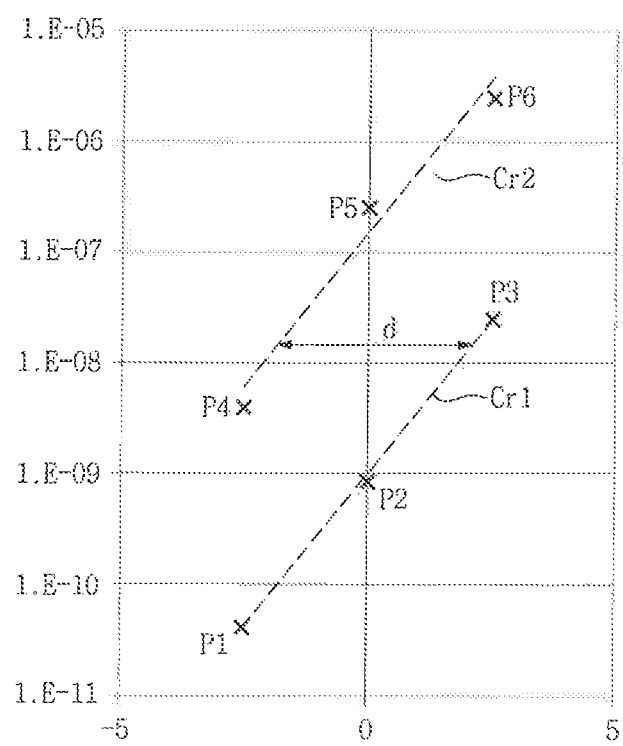
FIG. 7 is a view illustrating a part of a first regression curve and a part of a second regression curve according to an exemplary embodiment of the inventive concept.

FIG. 7 is a view illustrating a part of a first regression curve and a part of a second regression curve according to an exemplary embodiment of the inventive concept.

As described above, the first regression curve Cr1 is a curve that passes through at least one of the first point P1, the second point P2, and the third point P3, or is close to these points. An X-axis coordinate of the first point P1 corresponds to the first dummy gate voltage Vgd1 and a Y-axis coordinate of the first point P1 corresponds to the first dummy drain current Id1 corresponding to first dummy gate voltage Vgd1 at the first detection time point. An X-axis coordinate of the second point P2 corresponds to the second dummy gate voltage Vgd2 and a Y-axis coordinate of the second point P2 corresponds to the second dummy drain current Id2 corresponding to second dummy gate voltage Vgd2 at the first detection time point. An X-axis coordinate of the third point P3 corresponds to the third dummy gate voltage Vgd3 and a Y-axis coordinate of the third point P3 corresponds to the third dummy drain current Id3 corresponding to third dummy gate voltage Vgd3 at the first detection time point.

The second regression curve Cr2 is a curve that passes through at least one of a fourth point P4, a fifth point P5, and a sixth point P6, or is adjacent to these points. An X-axis coordinate of the fourth point P4 corresponds to the first dummy gate voltage Vgd1, and a Y-axis coordinate of the fourth point P4 corresponds to the first dummy drain current Id1 corresponding to the first dummy gate voltage Vgd1 at the second detection time point. An X-axis coordinate of the fifth point P5 corresponds to the second dummy gate voltage Vgd2, and a Y-axis coordinate of the fifth point P5 corresponds to the second dummy drain current Id2 corresponding to the second dummy gate voltage Vgd2 at the second detection time point. An X-axis coordinate of the sixth point P6 corresponds to the third dummy gate voltage Vgd3, and a Y-axis coordinate of the sixth point P6 corresponds to the third dummy drain current Id3 corresponding to the third dummy gate voltage Vgd3 at the second detection time point.

Assuming that "a" of the first equation and "a" of the second equation are substantially equal to each other as described above, a change amount of the dummy gate voltage may be defined by the following Equation 3.

$$(ln(((P1/P4)+(P2/P5)+(P3/P6))/3)/a \qquad \text{<Equation 3>}$$

Based on Equation 3, the following Equation 4 may be derived.

$$b^{*}e^{ax1} = b'^{*}e^{ax2} \qquad \text{<Equation 4>}$$

When a natural log is taken on both sides of the above Equation 4, the following Equation 5 is obtained.

$$ln(b^{*}e^{ax1}) = ln(b'^{*}e^{ax2}) \qquad \text{<Equation 5>}$$

Equation 5 may be summarized as the following Equation 6.

$$ln(b)+ax1 = ln(b')+ax2 \qquad \text{<Equation 6>}$$

As such the change amount x2−x1 of the dummy gate voltage may be obtained by the following Equation 7.

$$\Delta x = x2-x1 = (ln(b/b'))/a \qquad \text{<Equation 7>}$$

The change amount of the dummy gate voltage calculated by Equation 7 corresponds to the aforementioned compensation voltage Vc.

Figure 8:
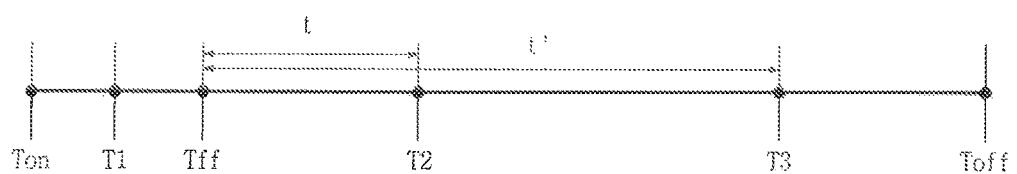
FIG. 8 is an explanatory view illustrating an operation of the compensation portion of FIG. 1 according to an exemplary embodiment of the inventive concept.

FIG. 8 is an explanatory view illustrating an operation of the compensation portion of FIG. 1 according to an exemplary embodiment of the inventive concept.

The compensation portion 300 detects the dummy drain current from the dummy portion 700 at a first detection time point T1, a second detection time point T2, and a third detection time point T3.

The first detection time point T1 (or a first period) may be between an on-time point Ton of the display device and a first frame period. For example, the first detection time point T1 may be between the on-time point Ton of the display device 500 and a start time point Tff of the first frame period. In other words, the first detection time point T1 refers to a time point between the time point when the display device is turned on and the start time point Tff of the first frame period.

The on-time point Ton of the display device 500 refers to a time point at which a driving power (e.g., a driving power Vcc) is input to the display device 500. For example, the on-time point Ton refers to a time point when the driving power Vcc reaches an active level from a base level. On the other hand, an off-time point Toff of the display device 500 refers to a time point at which the driving power Vcc input to the display device 500 reaches the base level from the active level. The aforementioned driving power may be applied from an external system to the power supply portion 605. The power supply portion 605 generates various analog DC voltages and digital voltages based on the driving power Vcc.

At the first detection time point T1, the compensation portion 300 detects the dummy drain current from the dummy portion 700, detects a change amount of the dummy gate voltage based on the detected dummy drain current, and generates the compensation voltage Vc based on the change amount of the dummy gate voltage. The compensation voltage Vc may be calculated by the aforementioned Equations 3, 4, 5, 6, and 7. For example, before the display device 500 is first turned on, the dummy switching element DTFT of the display device 500 may have the characteristic according to the first curve C1 described above, and at the first detection time point T1, the dummy switching element DTFT of the display device 500 may have the characteristic according to the second curve C2 described above. In this case, the compensation portion 300 detects the change amount of the dummy gate voltage based on the distance d between the first regression curve Cr1 and the second regression curve Cr2, and calculates the compensation voltage Vc corresponding to the detected change amount of the dummy gate voltage. In an exemplary embodiment of the inventive concept, in the case where the first curve C1 at a time point before the on-time point Ton of the display device 500 is substantially equal to the second curve C2 at the first detection time point T1, the change amount of the dummy gate voltage detected at the first detection time point T1 is 0, and the compensation voltage Vc of about 0 may be generated. In other words, when the change amount of the dummy gate voltage is 0, no compensation voltage Vc is generated.

When there is a change amount of the dummy gate voltage (a change amount less than or larger than 0) at the first detection time point T1, the power supply portion 605 adds the compensation voltage Vc to the gate-off voltage Voff which is currently being output and outputs the added voltage. Depending on a polarity of the compensation voltage Vc, the gate-off voltage Voff may be less than or greater than the gate-off voltage Voff before the first detection time point T1. The gate-off voltage Voff corrected by the compensation voltage Vc may be output from the power supply portion 605 at the first detection time point T1 (or the first detection period) or immediately after the first detection time point T1.

The second detection time point T2 (or a second detection period) may be between the first frame period and the off-time point Toff of the display device. For example, the second detection time point T2 may be between the start time point Tff of the first frame period and the off-time point Toff of the display device 500. The second detection time point T2 may be a time point that has elapsed from the start time point Tff of the first frame period by a time t. In other words, a time length between the start point Tff of the first frame and the second detection time point T2 may be the time t, where t is a positive rational number. In addition, the time at time t includes all measurable time units.

At the second detection time point T2, the compensation portion 300 detects the dummy drain current from the dummy portion 700, detects a change amount of the dummy gate voltage based on the detected dummy drain current, and generates the compensation voltage Vc based on the change amount of the dummy gate voltage. The compensation voltage Vc may be calculated by the aforementioned Equations 3, 4, 5, 6, and 7. For example, before the second detection time point T2, the dummy switching element DTFT of the display device 500 may have the characteristic according to the first curve C1 described above, and at the second detection time point T2, the dummy switching element DTFT of the display device 500 may have the characteristic according to the second curve C2 described above. The compensation portion 300 detects the change amount of the dummy gate voltage based on the distance d between the first regression curve Cr1 and the second regression curve Cr2, and compares the detected change amount of the dummy gate voltage with a predetermined threshold value. When the change amount of the dummy gate voltage is less than or equal to the threshold value, the compensation portion 300 does not generate the compensation voltage Vc or generates the compensation voltage Vc of 0. On the other hand, when the change amount of the dummy gate voltage is greater than the threshold value, the compensation portion 300 generates the compensation voltage Vc having a level corresponding to the change amount of the dummy gate voltage. The absolute value of the change amount of the dummy gate voltage may be compared to the threshold value.

When there is a change amount of the dummy gate voltage (a change amount larger than the threshold value) at the second detection time point T2, the power supply portion 605 adds the compensation voltage Vc to the gate-off voltage Voff which is currently being output and outputs the added voltage. Depending on a polarity of the compensation voltage Vc, the gate-off voltage Voff may be less than or larger than the gate-off voltage Voff before the second detection time point T2. The gate-off voltage Voff corrected by the compensation voltage Vc may be output from the power supply portion 605 at the second detection time point T2 (or the second detection period) or immediately after the second detection time point T2.

The third detection time point T3 (or a third detection period) may be between the first frame period and the off-time point Toff of the display device. For example, the third detection time point T3 may be between the start time point Tff of the first frame period and the off-time point Toff of the display device 500. The third detection time point T3 may be a time point that has elapsed from the start time point Tff of the first frame period by a time t'. In other words, a time length between the start point Tff of the first frame and the third detection time point T3 may be the time t', where t' is a positive rational number larger than the aforementioned time t. In addition, the time at time t' includes all measurable time units.

At the third detection time point T3, the compensation portion 300 detects the dummy drain current from the dummy portion 700, detects a change amount of the dummy gate voltage based on the detected dummy drain current, and generates the compensation voltage Vc based on the change amount of the dummy gate voltage. The compensation voltage Vc may be calculated by the aforementioned Equations 3, 4, 5, 6, and 7. For example, before the third detection time point T3, the dummy switching element DTFT of the display device 500 may have the characteristic according to the first curve C1 described above, and the dummy switching element DTFT of the display device 500 may have the characteristic according to the second curve C2 described above at the third detection time point T3. The compensation portion 300 detects the change amount of the dummy gate voltage based on the distance d between the first regression curve Cr1 and the second regression curve Cr2, and calculates the compensation voltage Vc corresponding to the detected change amount of the dummy gate voltage. In an exemplary embodiment of the inventive concept, in the case where the first curve C1 at a time point before the third detection time point T3 is substantially equal to the second curve C2 at the third detection time point T3, the change amount of the dummy gate voltage detected at the third detection time point T3 is 0, and the compensation voltage Vc of 0 may be generated. In other words, when the change amount of the dummy gate voltage is 0, no compensation voltage Vc is generated.

When there is a change amount of the dummy gate voltage (a change amount less than or larger than 0) at the third detection time point T3, the power supply portion 605 adds the compensation voltage Vc to the gate-off voltage Voff which is currently being output and outputs the added voltage. Depending on a polarity of the compensation voltage Vc, the gate-off voltage Voff may be less than or greater than the gate-off voltage Voff before the third detection time point T3. The gate-off voltage Voff corrected by the compensation voltage Vc may be output from the power supply portion 605 at the third detection time point T3 (or the third detection period) or immediately after the third detection time point T3.

On the other hand, when the off-time point Toff of the display device 500 is sufficiently late, the aforementioned third detection time point T3 may be generated periodically. In this case, the dummy drain current may be detected every time the time t' has elapsed from the start point Tff of the first frame period. For this operation, the display device 500 may further include a counter. The counter counts from the on-time point Ton of the display device 500. The counter outputs an active signal each time the counted value reaches a time length of the time t', and starts counting again from 0. The active signal output from the counter is applied to the compensation portion 300. The compensation portion 300 repeats the operation at the third detection time point T3 described above in response to the active signal.

In an exemplary embodiment of the inventive concept, in the case where the first compensation voltage is generated at the first detection time point T1 and a first gate-off voltage Voff is corrected to a second gate-off voltage Voff (the first gate-off voltage Voff+the first compensation voltage), when the second compensation voltage is generated at the second detection time point T2, the second compensation voltage is added to the second gate-off voltage Voff. In other words, a third gate-off voltage Voff at the second detection time point T2 is a sum of the second gate-off voltage Voff and the second compensation voltage.

Figure 9:
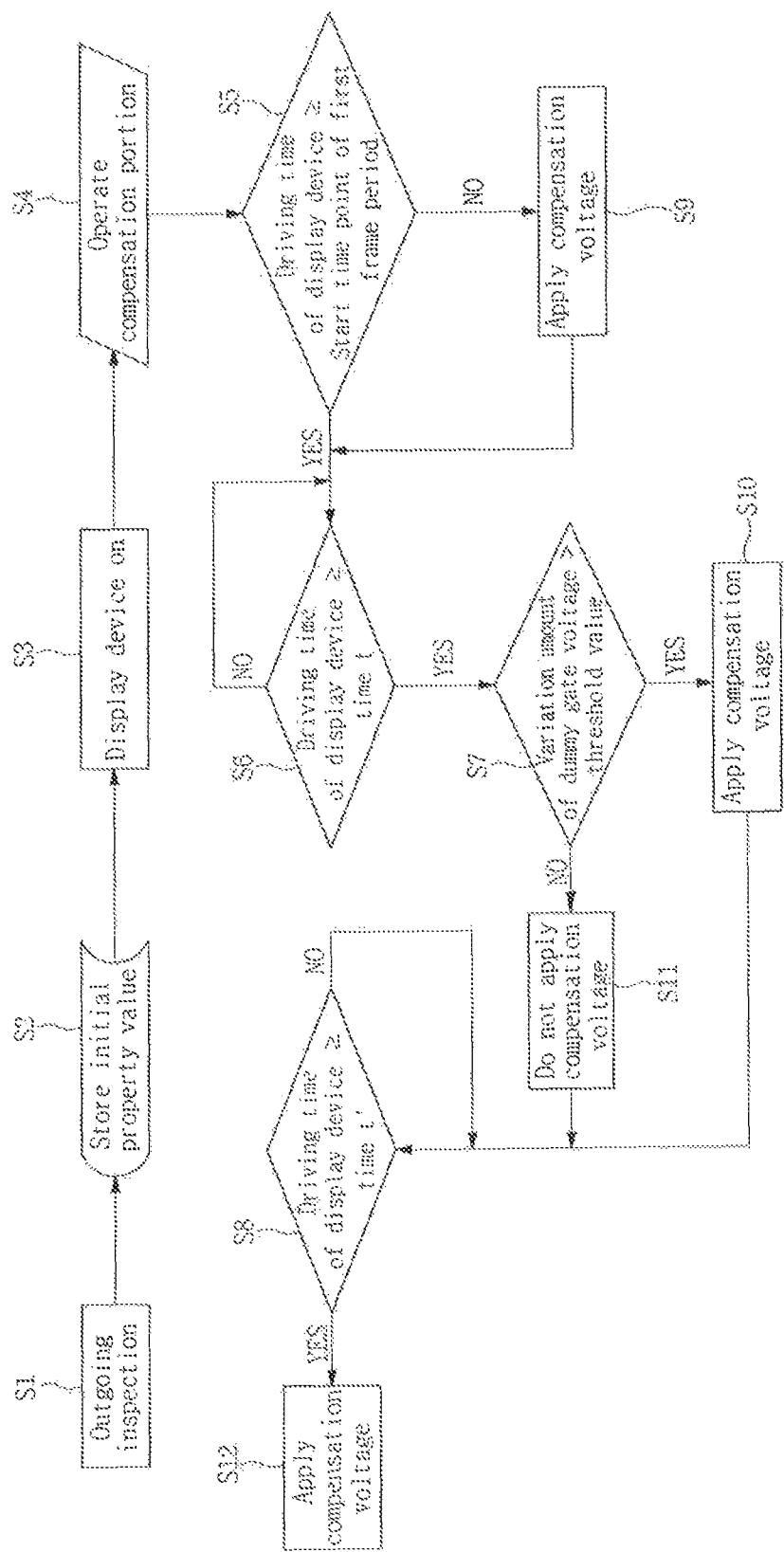
FIG. 9 is a flowchart illustrating an operation of the compensation portion of FIG. 8 according to an exemplary embodiment of the inventive concept.

FIG. 9 is a flowchart illustrating an operation of the compensation portion of FIG. 8 according to an exemplary embodiment of the inventive concept.

As illustrated in FIG. 9, when the display device 500 is completed (e.g., manufactured), an outgoing inspection is performed on the display device 500 (S1). During the outgoing inspection, the aforementioned property value "a" is stored in the display device 500 (S2).

Subsequently, the display device 500 is turned on for the first time, e.g., after arriving at a buyer's home (S3).

When the display device 500 is turned on, the compensation portion 300 operates (S4), a detailed operation of which will be described below.

First, the compensation portion 300 counts a time from the on-time point Ton of the display device 500 and determines whether the counted time (e.g., the driving time of the display device 500) is equal to or exceeds the start time point Tff of the first frame period (S5). Based on the determination result, when it is determined that the driving time of the display device 500 is before the start time point Tff of the first frame period, the compensation portion 300 generates the compensation voltage Vc and applies the compensation voltage Vc to the power supply portion 605 (S9). The compensation voltage Vc is substantially equal to the compensation voltage Vc calculated at the first detection time point T1 in FIG. 8.

On the other hand, based on the determination result in operation S5, when it is determined that the driving time of the display device 500 has passed the start time point Tff of the first frame period, the compensation portion 300 determines whether the driving time of the display device 500 reaches or exceeds the time t (S6). Based on the determination result in operation S6, when it is determined that the driving time of the display device 500 reaches or exceeds the time t, the compensation portion 300 determines whether the change amount of the dummy gate voltage exceeds a threshold value (S7). Based on the determination result in operation S7, when it is determined that the change amount of the dummy gate voltage exceeds the threshold value, the compensation portion 300 generates the compensation voltage Vc and applies the compensation voltage Vc to the power supply portion 605 (S10). This compensation voltage Vc is substantially equal to the compensation voltage Vc calculated at the second detection time point T2 in FIG. 8

On the other hand, based on the determination result in operation S7, when it is determined that the change amount of the dummy gate voltage is less than the threshold value, the compensation portion 300 does not generate the compensation voltage. Accordingly, the compensation voltage Vc is not applied to the power supply portion 605 (S11).

Subsequently, the compensation portion 300 determines whether the driving time of the display device reaches or exceeds the time t' (S8). Based on the determination result, when it is determined that the driving time of the display device 500 reaches or exceeds the time t', the compensation portion 300 generates the compensation voltage Vc and applies the compensation voltage Vc to the power supply portion 605 (S12). The compensation voltage Vc is substantially equal to the compensation voltage Vc calculated at the third detection time point T3 in FIG. 8.

On the other hand, based on the determination result in operation S8, when it is determined that the driving time of the display device has not reached the time t', the compensation portion 300 repeats operation S8 until the condition of operation S8 is satisfied.

In an exemplary embodiment of the inventive concept, the operation S4 may be omitted. In this case, the compensation portion 300 may apply the compensation voltage Vc immediately after the display device 500 is turned on. In other words, the compensation portion 300 may apply the compensation voltage Vc at the first detection time point T1 described above.

Figure 10:
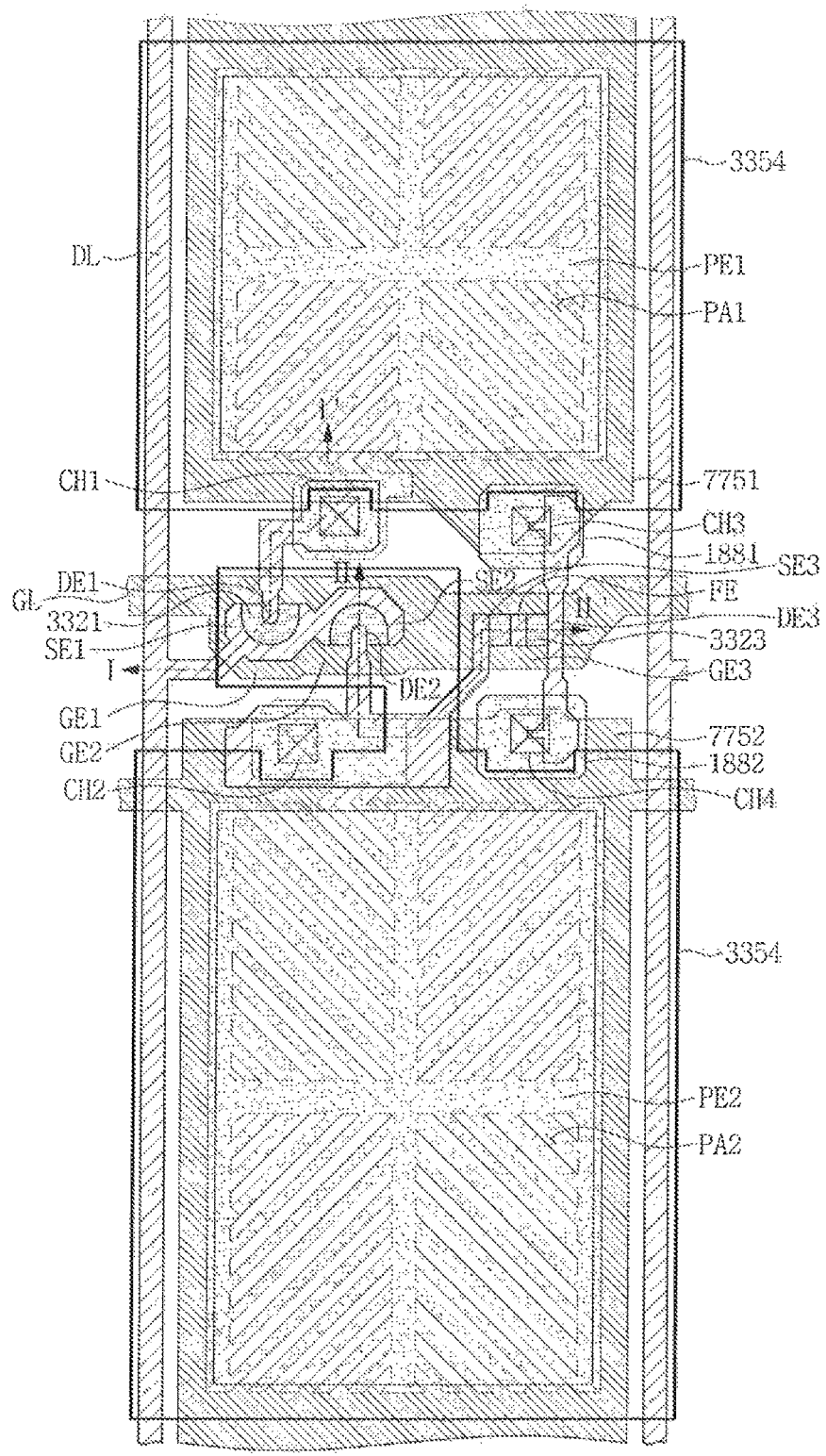
FIG. 10 is a view illustrating the pixel of FIG. 3 according to an exemplary embodiment of the inventive concept.
Figure 11:
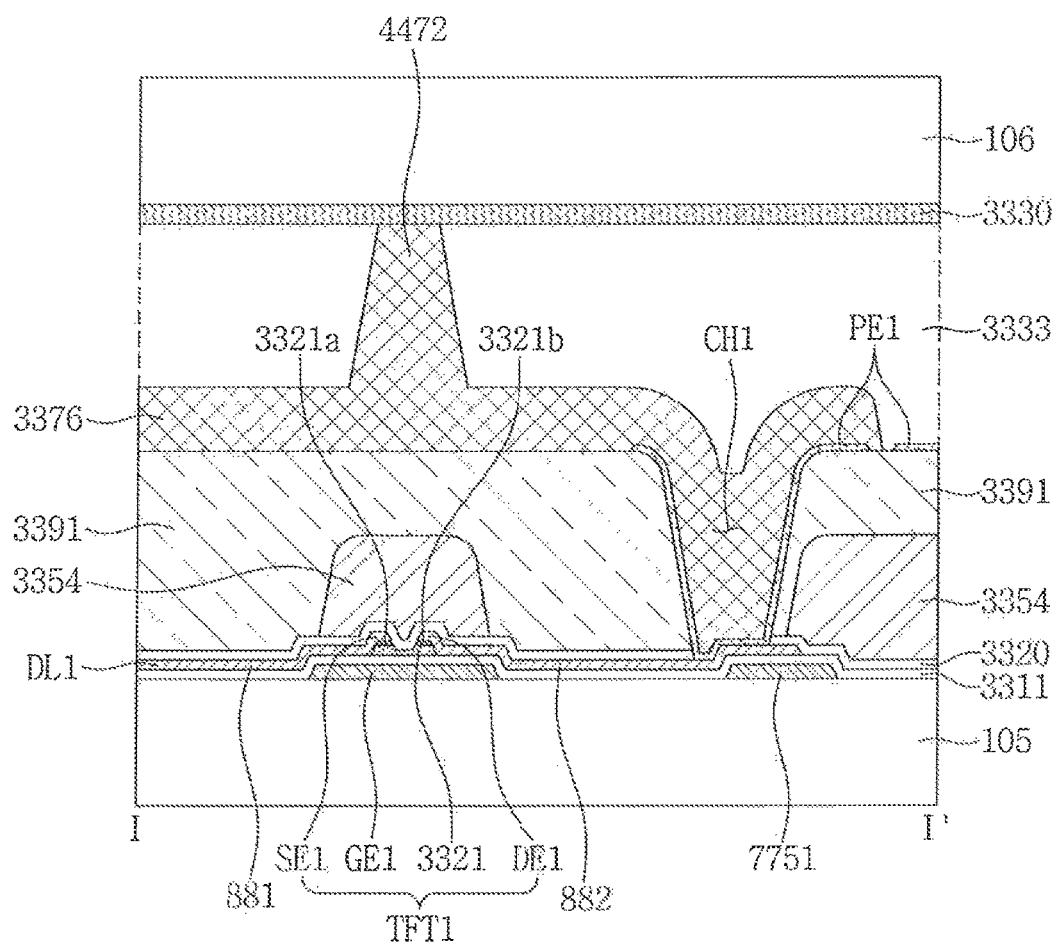
FIG. 11 is a cross-sectional view taken along the line I-I' of FIG. 10 according to an exemplary embodiment of the inventive concept.
Figure 12:
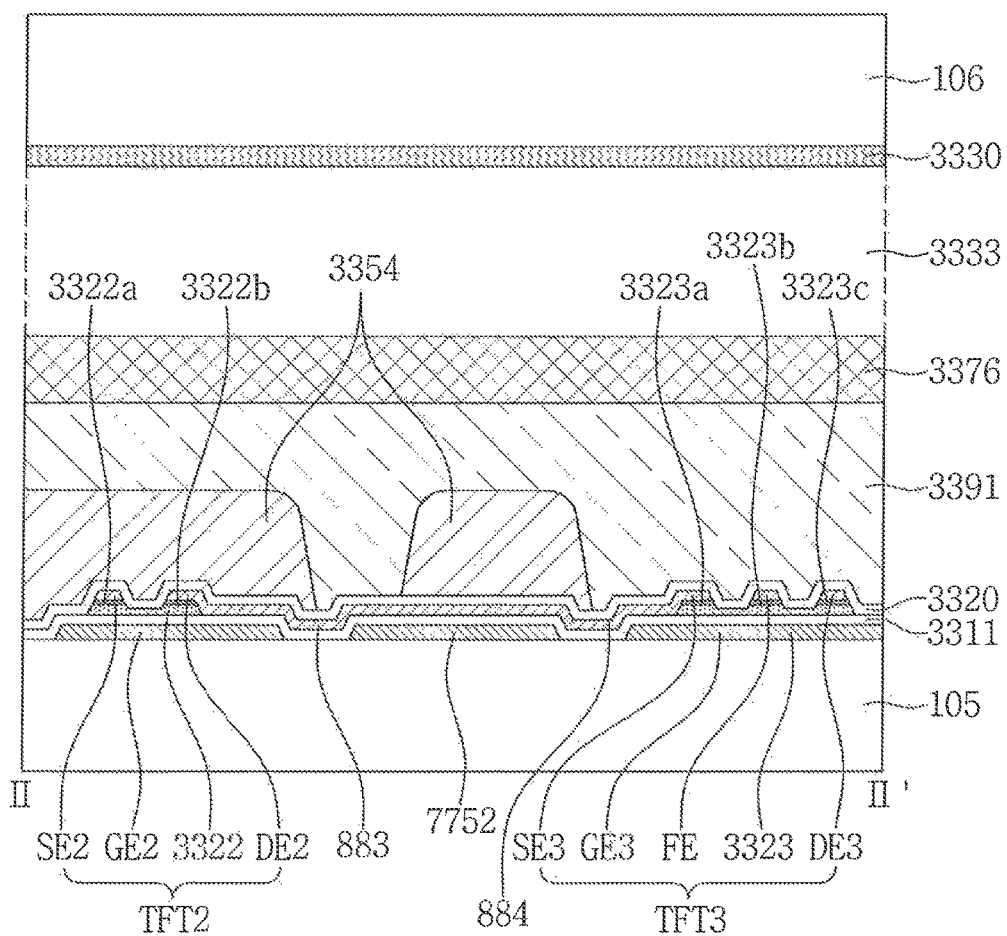
FIG. 12 is a cross-sectional view taken along the line II-II' of FIG. 10 according to an exemplary embodiment of the inventive concept.

FIG. 10 is a view illustrating the pixel of FIG. 3 according to an exemplary embodiment of the inventive concept, FIG. 11 is a cross-sectional view taken along the line I-I' of FIG. 10 according to an exemplary embodiment of the inventive concept, and FIG. 12 is a cross-sectional view taken along the line II-IT of FIG. 10 according to an exemplary embodiment of the inventive concept.

As illustrated in FIGS. 10, 11, and 12, the pixel PX includes a first switching element TFT1, a second switching element TFT2, a third switching element TFT3, a first sub-pixel electrode PE1, and a second sub-pixel electrode PE2 which are disposed on a first substrate 105.

In an exemplary embodiment of the inventive concept, the gate line GL, a first gate electrode GE1, a second gate electrode GE2, a first sustain electrode 7751, a second sustain electrode 7752, a gate insulating layer 3311, a first ohmic contact layer 3321a, a second ohmic contact layer 3321b, a third ohmic contact layer 3322a, a fourth ohmic contact layer 3322b, a fifth ohmic contact layer 3323a, a sixth ohmic contact layer 3323b, the data line DL, a protective layer 3320, a color filter 3354, and an insulating interlayer 3391 are disposed on the first substrate 105. In an exemplary embodiment of the inventive concept, the first ohmic contact layer 3321a, the second ohmic contact layer 3321b, the third ohmic contact layer 3322a, the fourth ohmic contact layer 3322b, the fifth ohmic contact layer 3323a, and the sixth ohmic contact layer 3323b may be omitted.

A light blocking portion 3376 and a common electrode 3330 are disposed on a second substrate 106.

A liquid crystal layer 3333 is disposed between the first substrate 105 and the second substrate 106.

As illustrated in FIGS. 10 and 11, the first switching element TFT1 includes the first gate electrode GE1, a first semiconductor layer 3321, a first source electrode SE1, and a first drain electrode DE1.

As illustrated in FIGS. 10 and 12, the second switching element TFT2 includes the second gate electrode GE2, a second semiconductor layer 3322, a second source electrode SE2, and a second drain electrode DE2.

As illustrated in FIGS. 10 and 12, the third switching element TFT3 includes a third gate electrode GE3, a third semiconductor layer 3323, a third source electrode SE3, a floating electrode FE, and a third drain electrode DE3.

As illustrated in FIGS. 10 and 11, the gate line GL is disposed on the first substrate 105. For example, the gate line GL is disposed between a first sub-pixel area PA1 and a second sub-pixel area PA2 of the first substrate 105.

As illustrated in FIG. 10, the first gate electrode GE1 may have a shape protruding from the gate line GL. The first gate electrode GE1 may be a part of the gate line GL. The first gate electrode GE1 may include a substantially same material and may have a substantially same structure (a multilayer structure) as those of the gate line GL. The first gate electrode GE1 and the gate line GL may be substantially simultaneously formed in a substantially same process.

As illustrated in FIG. 10, the second gate electrode GE2 may have a shape protruding from the gate line GL. The second gate electrode GE2 may be a part of the gate line GL. The second gate electrode GE2 may include a substantially same material and may have a substantially same structure (a multilayer structure) as those of the gate line GL. The second gate electrode GE2 and the gate line GL may be substantially simultaneously formed in a substantially same process.

As illustrated in FIG. 10, the third gate electrode GE3 may have a shape protruding from the gate line GL. The third gate electrode GE3 may be a part of the gate line GL. The third gate electrode GE3 may include a substantially same material and may have a substantially same structure (a multilayer structure) as those of the gate line GL. The third gate electrode GE3 and the gate line GL may be substantially simultaneously formed in a substantially same process.

As illustrated in FIG. 10, the first sustain electrode 7751 surrounds the first sub-pixel electrode PE1. In this example, the first sustain electrode 7751 overlaps an edge of the first sub-pixel electrode PE1. The first sustain electrode 7751 may include a substantially same material and may have a substantially same structure (a multilayer structure) as those of the aforementioned gate line GL. The first sustain electrode 7751 and the gate line GL may be substantially simultaneously formed in a substantially same process. A first sustain voltage is applied to the first sustain electrode 7751. The first sustain voltage may be substantially equal to the common voltage.

As illustrated in FIG. 10, the second sustain electrode 7752 surrounds the second sub-pixel electrode PE2. In this example, the second sustain electrode 7752 overlaps an edge of the second sub-pixel electrode PE2. The second sustain electrode 7752 may include a substantially same material and may have a substantially same structure (a multilayer structure) as those of the aforementioned gate line GL. The second sustain electrode 7752 and the gate line GL may be substantially simultaneously formed in a substantially same process. A second sustain voltage is applied to the second sustain electrode 7752. The second sustain voltage may be substantially equal to the common voltage. In an exemplary embodiment of the inventive concept, second sustain electrodes 7752 of pixels adjacent to one another along the gate line GL may be connected to one another. In addition, second sustain electrodes 7752 and first sustain electrodes 7751 of pixels adjacent to one another along the data line DL may be connected to one another.

As illustrated in FIGS. 11 and 12, the gate insulating layer 3311 is disposed on the gate line GL, the first gate electrode GE1, the second gate electrode GE2, the first sustain electrode 7751, and the second sustain electrode 7752. In this example, the gate insulating layer 3311 may be disposed over an entire surface of the first substrate 105 including the gate line GL, the first gate electrode GE1, the second gate electrode GE2, the first sustain electrode 7751, the second sustain electrode 7752, and the sustain line 7750. The gate insulating layer 3311 has an opening corresponding to a third contact hole CH3 and a fourth contact hole CH4. A part of the third drain electrode DE3 and the first sustain electrode 7751 are exposed through the third contact hole CH3 and another part of the third drain electrode DE3 and the second sustain electrode 7752 are exposed through the fourth contact hole CH4.

As illustrated in FIG. 11, the data line DL is disposed on the gate insulating layer 3311. The data line DL crosses the gate line GL. A portion of the data line DL may have a line width less than a line width of another portion thereof at an intersection of the data line DL and the gate line GL.

As illustrated in FIG. 11, the first semiconductor layer 3321 is disposed on the gate insulating layer 3311. As illustrated in FIGS. 10 and 11, the first semiconductor layer 3321 overlaps at least a portion of the first gate electrode GE1. The first semiconductor layer 3321 may include amorphous silicon, polycrystalline silicon, or the like.

As illustrated in FIG. 11, the first and second ohmic contact layers 3321a and 3321b are disposed on the first semiconductor layer 3321. The first ohmic contact layer 3321a and the second ohmic contact layer 3321b face each other, having a channel area of the first switching element TFT1 therebetween.

As illustrated in FIG. 12, the second semiconductor layer 3322 is disposed on the gate insulating layer 3311. As illustrated in FIGS. 10 and 12, the second semiconductor layer 3322 overlaps at least a portion of the second gate electrode GE2. The second semiconductor layer 3322 may include amorphous silicon, polycrystalline silicon, or the like.

As illustrated in FIG. 12, the third and fourth ohmic contact layers 3322a and 3322b are disposed on the second semiconductor layer 3322. The third ohmic contact layer 3322a and the fourth ohmic contact layer 3322b face each other, having a channel area of the second switching element TFT2 therebetween.

The first ohmic contact layer 3321a and the third ohmic contact layer 3322a are connected to each other. For example, the first ohmic contact layer 3321a and the third ohmic contact layer 3322a may be formed unitarily.

As illustrated in FIG. 12, the third semiconductor layer 3323 is disposed on the gate insulating layer 3311. As illustrated in FIGS. 10 and 12, the third semiconductor layer 3323 overlaps at least a portion of the third gate electrode GE3.

As illustrated in FIGS. 12, the fifth, sixth, and seventh ohmic contact layers 3323a, 3323b, and 3323c are disposed on the third semiconductor layer 3323. The fifth ohmic contact layer 3323a and the sixth ohmic contact layer 3323b face each other with a first channel area of the third switching element TFT3 therebetween, and the sixth ohmic contact layer 3323b and the seventh ohmic contact layer 3323c face each other with a second channel area of the third switching element TFT3 therebetween.

As illustrated in FIG. 11, the first source electrode SE1 is also disposed on the first ohmic contact layer 3321a and the gate insulating layer 3311. The first source electrode SE1 may have a shape protruding from the data line DL. The first source electrode SE1 may be a part of the data line DL. At least a portion of the first source electrode SE1 overlaps the first semiconductor layer 3321 and the first gate electrode GE1. The first source electrode SE1 may have one of an I-like shape, a C-like shape, or a U-like shape. The first source electrode SE1 having a U-like shape is illustrated in FIG. 10, and a convex portion of the first source electrode SE1 is directed toward the second sub-pixel electrode PE2. The first source electrode SE1 may include a substantially same material and may have a substantially same structure (a multilayer structure) as those of the aforementioned data line DL. The first source electrode SE1 and the data line DL may be substantially simultaneously formed in a substantially same process.

A portion of the first source electrode SE1 overlaps the first gate electrode GE1 and another portion of the first source electrode SE1 (hereinafter, a first portion 881) does not overlap the first gate electrode GE1. The first portion 881 of the first source electrode SE1 described above also does not overlap elements disposed on a layer substantially the same as a layer on which the first gate electrode GE1 is disposed. For example, the first portion 881 also does not overlap the gate line GL, the second gate electrode GE2, the third gate electrode GE3, the first sustain electrode 7751, and the second sustain electrode 7752.

As illustrated in FIG. 11, the first drain electrode DE1 is disposed on the second ohmic contact layer 3321b and the gate insulating layer 3311. At least a portion of the first drain electrode DE1 overlaps the first semiconductor layer 3321 and the first gate electrode GE1. The first drain electrode DE1 is connected to the first sub-pixel electrode PE1. The first drain electrode DE1 may include a substantially same material and may have a substantially same structure (a multilayer structure) as those of the data line DL. The first drain electrode DE1 and the data line DL may be substantially simultaneously formed in a substantially same process.

A portion of the first drain electrode DE1 overlaps the first gate electrode GE1 and another portion of the first drain electrode DE1 (hereinafter, a second portion 882) does not overlap the first gate electrode GE1. The second portion 882 of the first drain electrode DE1 described above also does not overlap elements disposed on a layer substantially the same as a layer on which the first gate electrode GE1 is disposed. For example, the second portion 882 also does not overlap the gate line GL, the second gate electrode GE2, the third gate electrode GE3, the first sustain electrode 7751, and the second sustain electrode 7752.

The channel area of the first switching element TFT1 is disposed at a portion of the first semiconductor layer 3321 between the first source electrode SE1 and the first drain electrode DEL A portion of the first semiconductor layer 3321 corresponding to the channel area has a thickness less than a thickness of another portion of the first semiconductor layer 3321.

As illustrated in FIG. 12, the second source electrode SE2 is disposed on the third ohmic contact layer 3322a. The third ohmic contact layer 3322a is also disposed on the gate insulating layer 3311. The second source electrode SE2 is formed unitarily with the first source electrode SE1. At least a portion of the second source electrode SE2 overlaps the second semiconductor layer 3322 and the second gate electrode GE2. The second source electrode SE2 may have one of an I-like shape, a C-like shape, or a U-like shape. The second source electrode SE2 may include a substantially same material and may have a substantially same structure (a multilayer structure) as those of the aforementioned data line DL. The second source electrode SE2 and the data line DL may be substantially simultaneously formed in a substantially same process.

As illustrated in FIG. 12, the second drain electrode DE2 is disposed on the fourth ohmic contact layer 3322b and the gate insulating layer 3311. At least a portion of the second drain electrode DE2 overlaps the second semiconductor layer 3322 and the second gate electrode GE2. The second drain electrode DE2 is connected to the second sub-pixel electrode PE2. The second drain electrode DE2 may include a substantially same material and may have a substantially same structure (a multilayer structure) as those of the data line DL. The second drain electrode DE2 and the data line DL may be substantially simultaneously formed in a substantially same process.

A portion of the second drain electrode DE2 overlaps the second gate electrode GE2 and another portion of the second drain electrode DE2 (hereinafter, a third portion 883) does not overlap the second gate electrode GE2. The third portion 883 of the second drain electrode DE2 described above also does not overlap elements disposed on a layer substantially the same as a layer on which the second gate electrode GE2 is disposed. For example, the third portion 883 also does not overlap the gate line GL, the first gate electrode GE1, the third gate electrode GE3, the first sustain electrode 7751, and the second sustain electrode 7752.

The channel area of the second switching element TFT2 is disposed at a portion of the second semiconductor layer 3322 between the second source electrode SE2 and the second drain electrode DE2. A portion of the second semiconductor layer 3322 corresponding to the channel area has a thickness less than a thickness of another portion of the second semiconductor layer 3322.

As illustrated in FIG. 12, the third source electrode SE3 is disposed on the fifth ohmic contact layer 3323a and the gate insulating layer 3311. The third source electrode SE3 and the second drain electrode DE2 are formed unitarily. At least a portion of the third source electrode SE3 overlaps the third semiconductor layer 3323 and the third gate electrode GE3. The third source electrode SE3 may have one of an I-like shape, a C-like shape, or a U-like shape. The third source electrode SE3 may include a substantially same material and may have a substantially same structure (a multilayer structure) as those of the data line DL. The third source electrode SE3 and the data line DL may be substantially simultaneously formed in a substantially same process.

A portion of the third source electrode SE3 overlaps the third gate electrode GE3 and another portion of the third source electrode SE3 (hereinafter, a fourth portion 884) does not overlap the third gate electrode GE3. The fourth portion 884 of the third source electrode SE3 described above also does not overlap elements disposed on a layer substantially the same as a layer on which the third gate electrode GE3 is disposed. For example, the fourth portion 884 also does not overlap the gate line GL, the first gate electrode GE1, the second gate electrode GE2, the first sustain electrode 7751, and the second sustain electrode 7752.

As illustrated in FIG. 12, a floating electrode FE is disposed on the sixth ohmic contact layer 3323b. The floating electrode FE does not contact any conductor other than the sixth ohmic contact layer 3323b. At least a portion of the floating electrode FE overlaps the third semiconductor layer 3323 and the third gate electrode GE3. The floating electrode FE may have one of an I-like shape, a C-like shape, or a U-like shape. The floating electrode FE may include a substantially same material and may have a substantially same structure (a multilayer structure) as those of the aforementioned data line DL. The floating electrode FE and the data line DL may be substantially simultaneously formed in a substantially same process.

As illustrated in FIG. 12, the third drain electrode DE3 is disposed on the seventh ohmic contact layer 3323c. The third drain electrode DE3 is also disposed on the gate insulating layer 3311. At least a part of the third drain electrode DE3 overlaps the second semiconductor layer 3322 and the third gate electrode GE3. The third drain electrode DE3 is connected to the first sustain electrode 7751 and the second sustain electrode 7752. The third drain electrode DE3 may include a substantially same material and may have a substantially same structure (a multilayer structure) as those of the aforementioned data line DL. The third drain electrode DE3 and the data line DL may be substantially simultaneously formed in a substantially same process.

The first channel area of the third switching element TFT3 is disposed at a portion of the third semiconductor layer 3323 between the third source electrode SE3 and the floating electrode FE, and the second channel area of the third switching element TFT3 is disposed at a portion of the third semiconductor layer 3323 between the floating electrode FE and the third drain electrode DE3. The portion of the third semiconductor layer 3323 corresponding to the first and second channel areas has a thickness less than a thickness of another portion of the third semiconductor layer 3323.

The first semiconductor layer 3321 may be further disposed between the gate insulating layer 3311 and the first source electrode SE1. In addition, the first semiconductor layer 3321 may be further disposed between the gate insulating layer 3311 and the first drain electrode DEL Herein, a semiconductor layer disposed between the gate insulating layer 3311 and the first source electrode SE1 will be referred to as a first additional semiconductor layer and a semiconductor layer disposed between the gate insulating layer 3311 and the first drain electrode DE1 will be referred to as a second additional semiconductor layer. In this case, the aforementioned first ohmic contact layer 3321a may be further disposed between the first additional semiconductor layer and the first source electrode SE1, and the aforementioned second ohmic contact layer 3321b may be further disposed between the second additional semiconductor layer and the first drain electrode DE1.

In addition, the second semiconductor layer 3322 may be further disposed between the gate insulating layer 3311 and the second source electrode SE2. In addition, the second semiconductor layer 3322 may be further disposed between the gate insulating layer 3311 and the second drain electrode DE2. Herein, a semiconductor layer between the gate insulating layer 3311 and the second source electrode SE2 will be referred to as a third additional semiconductor layer, and a semiconductor layer between the gate insulating layer 3311 and the second drain electrode DE2 will be referred to as a fourth additional semiconductor layer. In this case, the aforementioned third ohmic contact layer 3322a may be further disposed between the third additional semiconductor layer and the second source electrode SE2, and the aforementioned fourth ohmic contact layer 3322b may be further disposed between the fourth additional semiconductor layer and the second drain electrode DE2.

In addition, the third semiconductor layer 3323 may be further disposed between the gate insulating layer 3311 and the third source electrode SE3. Moreover, the third semiconductor layer 3323 may be further disposed between the gate insulating layer 3311 and the third drain electrode DE3. Herein, the semiconductor layer between the gate insulating layer 3311 and the third source electrode SE3 will be referred to as a fifth additional semiconductor layer, and the semiconductor layer between the gate insulating layer 3311 and the third drain electrode DE3 will be referred to as a sixth additional semiconductor layer. In this case, the aforementioned fifth ohmic contact layer 3323a may be further disposed between the fifth additional semiconductor layer and the third source electrode SE3, and the aforementioned seventh ohmic contact layer 3323c may be further disposed between the sixth additional semiconductor layer and the third drain electrode DE3.

In addition, the first semiconductor layer 3321 may be further disposed between the gate insulating layer 3311 and the data line DL. For example, the first semiconductor layer 3321 may be further disposed between the gate insulating layer 3311 and the data line DL. Herein, the semiconductor layer between the gate insulating layer 3311 and the data line DL will be referred to as a seventh additional semiconductor layer. In this case, the aforementioned first ohmic contact layer 3321a may be further disposed between the seventh additional semiconductor layer and the data line DL.

As illustrated in FIG. 11, the protective layer 3320 is disposed on the data line DL, the first source electrode SE1, the second source electrode SE2, the third source electrode SE3, the floating electrode FE, the first drain electrode DE1, the second drain electrode DE2 and the third drain electrode DE3. For example, the protective layer 3320 may be disposed over an entire surface of the first substrate 105 including the data line DL, the first source electrode SE1, the second source electrode SE2, the third source electrode SE3, the floating electrode FE, the first drain electrode DE1, the second drain electrode DE2 and the third drain electrode DE3. The protective layer 3320 has openings corresponding to a first contact hole CH1, a second contact hole CH2, the third contact hole CH3, and the fourth contact hole CH4. The first drain electrode DE1 is exposed through the first contact hole CH1 and the second drain electrode DE2 is exposed through the second contact hole CH2.

As illustrated in FIGS. 11 and 12, the color filter 3354 is disposed on the protective layer 3320. As illustrated in FIG. 10, the color filter 3354 is disposed at the first sub-pixel area PA1 and the second sub-pixel area PA2. In an exemplary embodiment of the inventive concept, the color filter 3354 is not disposed at the first contact hole CH1, the second contact hole CH2, the third contact hole CH3, and the fourth contact hole CH4. In an exemplary embodiment of the inventive concept, an edge of the color filter 3354 may overlap an edge of another color filter adjacent thereto. Color filters of a substantially same color are disposed at the first sub-pixel area PA1 and the second sub-pixel area PA2 included in one pixel.

In addition, the color filter 3354 overlaps the first sub-pixel electrode PE1 and the second sub-pixel electrode PE2. Moreover, the color filter 3354 may overlap remaining portions of the first, second, and third switching elements TFT1, TFT2, and TFT3 except the first, second, third, and fourth portions 881, 882, 883, and 884 described above. For example, the color filter 3354 may overlap a remaining portion of the first switching element TFT1 except the first and second portions 881 and 882, a remaining portion of the second switching element TFT2 except the third portion 883, and a remaining portion of the third switching element TFT3 except the fourth portion 884.

An insulating interlayer 3391 is disposed on the color filter 3354 and the protective layer 3320. For example, the insulating interlayer 3391 may be disposed over an entire surface of the first substrate 105 including the color filter 3354 and the protective layer 3320. The insulating interlayer 3391 has openings corresponding to the first contact hole CH1, the second contact hole CH2, the third contact hole CH3, and the fourth contact hole CH4.

The first sub-pixel electrode PE1 is disposed on the insulating interlayer 3391 at the first sub-pixel area PA1 The first sub-pixel electrode PE1 is connected to the first drain electrode DE1 through the first contact hole CH1 The first sub-pixel electrode PE1 may include a transparent conductive material such as indium tin oxide (ITO) or indium zinc oxide (IZO). For example, ITO may be a polycrystalline or monocrystalline material, and IZO may be a polycrystalline or monocrystalline material as well.

The second sub-pixel electrode PE2 is disposed on an insulating interlayer 3392 at the second sub-pixel area PA2. The second sub-pixel electrode PE2 is connected to the second drain electrode DE2 through the second contact hole CH2. The second sub-pixel electrode PE2 may include a substantially same material as a material included in the aforementioned first pixel electrode PE1.

A first connection electrode 1881 is disposed on the insulating interlayer 3391 corresponding to the third contact hole CH3. The first connection electrode 1881 connects a portion of the third drain electrode DE3 and the first sustain electrode 7751. The first connection electrode 1881 may include a substantially same material as a material included in the aforementioned pixel electrode PE.

A second connection electrode 1882 is disposed on the insulating interlayer 3391 corresponding to the fourth contact hole CH4. The second connection electrode 1882 connects another portion of the third drain electrode DE3 and the second sustain electrode 7752. The second connection electrode 1882 may include a substantially same material as a material included in the aforementioned pixel electrode PE.

The light blocking portion 3376 is disposed on the insulating interlayer 3392 except for the first sub-pixel area PA1 and the second sub-pixel area PA2.

A column spacer 4472 is disposed on the light blocking portion 3376.

The display device according to an exemplary embodiment of the inventive concept may further include a first polarization plate and a second polarization plate. When a surface of the first substrate 105 and a surface of the second substrate 106 that face each other are defined as upper surfaces of the corresponding substrates, and surfaces opposite to the upper surfaces are defined as lower surfaces of the corresponding substrates, the first polarization plate is disposed on the lower surface of the first substrate 105, and the second polarization plate is disposed on the lower surface of the second substrate 106.

A transmission axis of the first polarization plate and a transmission axis of the second polarization plate are orthogonal to each other, and one of the transmission axes is arranged parallel to the gate line GL. In an exemplary embodiment of the inventive concept, the display device may include only one of the first polarization plate and the second polarization plate.

In an exemplary embodiment of the inventive concept, the display device may further include a light blocking electrode. The light blocking electrode is disposed on the insulating interlayer 3391 so as to overlap the data line DL. The light blocking electrode is disposed along the data line DL. The light blocking electrode includes a material substantially the same as a material included in the first sub-pixel electrode PE1.

The light blocking electrode receives the aforementioned common voltage. The light blocking electrode substantially prevents an electric field from being generated between the data line DL and the sub-pixel electrode (the first and second sub-pixel electrodes PE1 and PE2). In addition, since the light blocking electrode and the common electrode 3330 which receive a same common voltage become equipotential, a light having passed through the liquid crystal layer 3333 between the light blocking electrode and the common electrode 3330 is blocked by the second polarization plate. Accordingly, light leakage at a portion corresponding to the data line DL may be substantially prevented. In addition, since the light blocking electrode may replace a portion of the light blocking portion 3376 on the data line DL, a portion of the light blocking portion 3376 on the data line DL may be removed when such a light blocking electrode is provided. Accordingly, when the light blocking electrode is provided, an aperture ratio of the pixel may be further increased.

The dummy pixel DPX illustrated in FIG. 3 may have a configuration substantially the same as a configuration of the pixel illustrated in FIGS. 10, 11, and 12. For example, the first switching element TFT1 of the dummy pixel DPX corresponds to the switching element of the dummy switching element DTFT described above, and the first sub-pixel electrode PE1 of the dummy pixel DPX corresponds to the pixel electrode PE of the dummy switching element DTFT. In other words, the dummy pixel DPX having the configuration illustrated in FIGS. 10, 11, and 12 is connected to the compensation portion 300 through the first sub-pixel electrode PE1. On the other hand, the second sub-pixel electrode PE2 of the dummy pixel DPX having the configuration illustrated in FIGS. 10, 11, and 12 is not connected to the compensation portion 300.

In addition, when the dummy pixel DPX has a configuration substantially the same as that of the pixel illustrated in FIGS. 10, 11, and 12, the dummy pixel DPX is connected to the aforementioned dummy gate line DGL instead of the gate line GL, and connected to the aforementioned dummy data line DDL instead of the data line DL.

Figure 13:
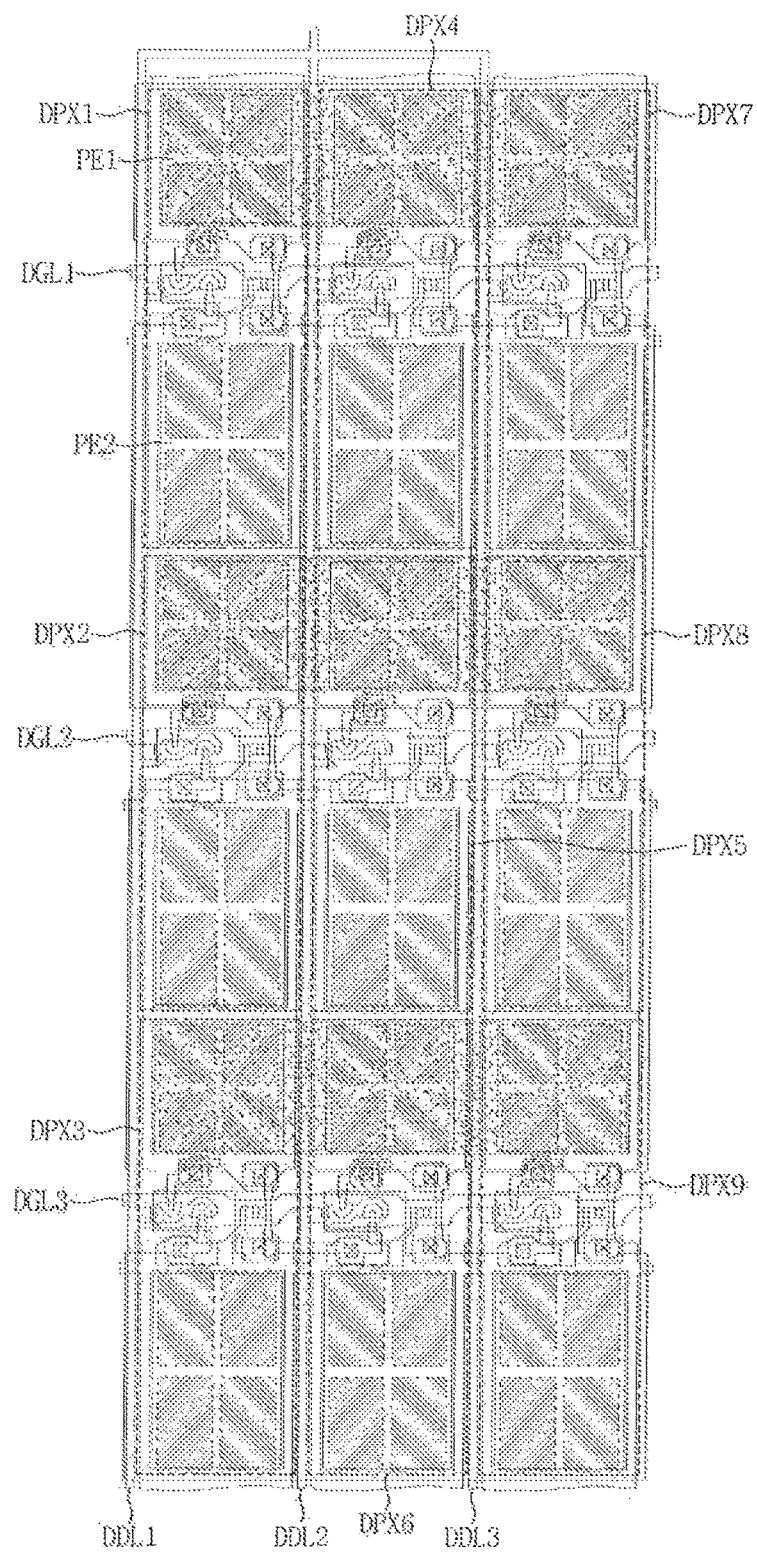
FIG. 13 is a view illustrating the dummy pixels of FIG. 4 according to an exemplary embodiment of the inventive concept.

FIG. 13 is a view illustrating the dummy pixels of FIG. 4 according to an exemplary embodiment of the inventive concept.

A plurality of dummy pixels DPX having the configuration of FIGS. 10, 11, and 12 may have a connection relationship as illustrated in FIG. 13. In other words, each of first, second, third, fourth, fifth, sixth, seventh, eighth, and ninth dummy pixels DPX1, DPX2, DPX3, DPX4, DPXS, DPX6, DPX7, DPX8, and DPX9 of FIG. 13 may have the configuration of FIGS. 10, 11, and 12 described above, and the first, second, third, fourth, fifth, sixth, seventh, eighth, and ninth dummy pixels DPX1, DPX2, DPX3, DPX4, DPXS, DPX6, DPX7, DPX8, and DPX9 may be connected to first, second, and third dummy gate lines DGL1, DGL2, and DGL3 and first, second, and third dummy data lines DDL1, DDL2, and DDL3, similar to the first, second, third, fourth, fifth, sixth, seventh, eighth, and ninth dummy pixels DPX1, DPX2, DPX3, DPX4, DPXS, DPX6, DPX7, DPX8, and DPX9 illustrated in FIG. 4.

As illustrated in FIG. 13, the first sub-pixel electrode PE1 of the first dummy pixel DPX1, the first sub-pixel electrode PE1 of the fourth dummy pixel DPX4, and the first sub-pixel electrode PE1 of the seventh dummy pixel DPX7 are connected to one another. In addition, the first sub-pixel electrode PE1 of the second dummy pixel DPX2, the first sub-pixel electrode PE1 of the fifth dummy pixel DPX5 and the first sub-pixel electrode PE1 of the eighth dummy pixel DPX8 are connected to one another. Moreover, the first sub-pixel electrode PE1 of the third dummy pixel DPX3, the first sub-pixel PE1 electrode of the sixth dummy pixel DPX6, and the first sub-pixel electrode PE1 of the ninth dummy pixel DPX9 are connected to one another.

The first switching element TFT1 of the dummy pixel (one of the dummy pixels DPX1, DPX2, DPX3, DPX4, DPX5, DPX6, DPX7, DPX8, and DPX9) illustrated in FIG. 13 and the first switching element TFT1 of the pixel PX illustrated in FIG. 10 may have a substantially equal size and a substantially identical shape. For example, a channel width and a channel length of the first switching element TFT1 included in the dummy pixel may be substantially equal to a channel width and a channel length of the first switching element TFT1 included in the pixel PX, respectively. In addition, the first switching element TFT1 included in the dummy pixel and the first switching element TFT1 included in the pixel PX may have a substantially equal threshold voltage.

Figure 14:
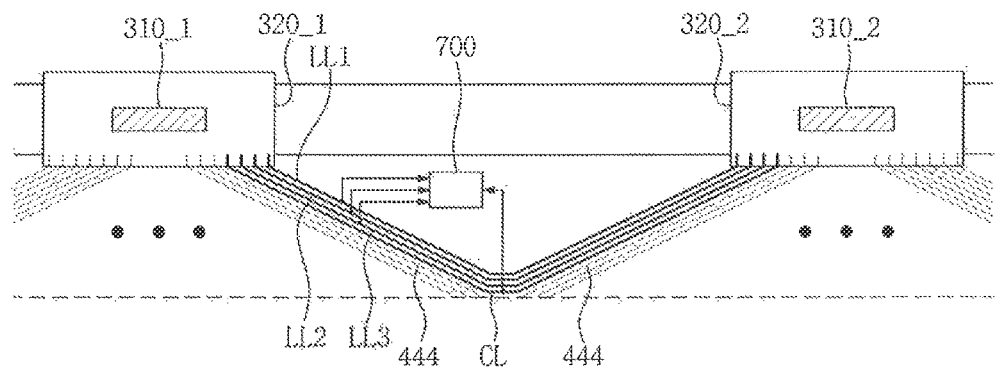
FIG. 14 is a view illustrating the dummy portion and a peripheral portion thereof in FIG. 1 according to an exemplary embodiment of the inventive concept.

FIG. 14 is a view illustrating the dummy portion and a peripheral portion thereof in FIG. 1 according to an exemplary embodiment of the inventive concept.

The dummy portion 700 may be disposed between the link lines 444 connected to two data driving ICs 310_1 and 310_2 adjacent to each other, as illustrated in FIG. 14.

The dummy portion 700 may include the dummy pixels DPX1, DPX2, DPX3, DPX4, DPX5, DPX6, DPX7, DPX8, and DPX9 connected to the three dummy gate lines DGL1, DGL2, and DGL3 and the three dummy data lines DDL1, DDL2, and DDL3, as illustrated in FIG. 4. The three dummy gate lines DGL1, DGL2, and DGL3 may be connected to three low voltage power lines LL1, LL2, and LL3, and the three dummy data lines DDL1, DDL2, and DDL3 may be connected to a common power line CL. For example, the first dummy gate line DGL1 may be connected to a first low voltage power line LL1, the second dummy gate line DGL2 may be connected to a second low voltage power line LL2, the third dummy gate line DGL3 may be connected to a third low voltage power line LL3, and the first, second, and third dummy data lines DDL1, DDL2, and DDL3 may be connected to the common power line CL.

The first low voltage power line LL1, the second low voltage power line LL2, the third low voltage power line LL3, and the common power line CL are disposed on the first substrate 105. For example, the first low voltage power line LL1, the second low voltage power line LL2, the third low voltage power line LL3, and the common power line CL are disposed at the non-display area 105b between the first link line and the second link line. The first low voltage power line LL1 transmits the aforementioned first dummy gate voltage Vgd1, the second low voltage power line LL2 transmits the aforementioned second dummy gate voltage Vgd2, the third low voltage power line LL3 transmits the aforementioned third dummy gate voltage Vgd3, and the common power line CL transmits the aforementioned dummy data voltage Vdd. The dummy data voltage Vdd may be the common voltage.

In an exemplary embodiment of the inventive concept, in the aforementioned non-detection period, each of the first, second, and third low voltage power lines LL1, LL2, and LL3 transmits the gate-off voltage Voff.

Figure 15:
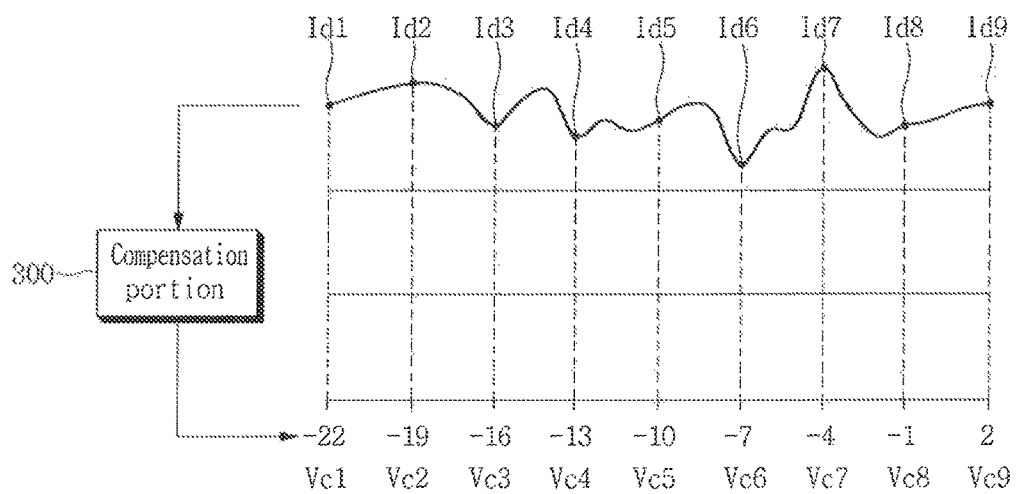
FIG. 15 is an explanatory view illustrating an operation of the compensation portion of FIGS. 1, 2, and 3 according to an exemplary embodiment of the inventive concept.

FIG. 15 is an explanatory view illustrating an operation of the compensation portion of FIGS. 1, 2, and 3 according to an exemplary embodiment of the inventive concept.

The compensation portion 300 may output a plurality of compensation voltages Vc1, Vc2, Vc3, Vc4, Vc5, Vc6, Vc7, Vc8, and Vc9 having different values, as illustrated in FIG. 15. For example, the plurality of compensation voltages may include a first compensation voltage Vc1 of about −22 V, a second compensation voltage Vc2 of about −19 V, a third compensation voltage Vc3 of about −16 V, a fourth compensation voltage Vc4 of about −13 V, a fifth compensation voltage Vc5 of about −10 V, a sixth compensation voltage Vc6 of about −7 V, a seventh compensation voltage Vc7 of about −4 V, an eighth compensation voltage Vc8 of about −1 V, and a ninth compensation voltage Vc9 of about +2 V. The plurality of compensation voltages Vc1, Vc2, Vc3, Vc4, Vc5, Vc6, Vc7, Vc8, and Vc9 have an arithmetic progression relationship. For example, a difference between the first compensation voltage Vc1 and the second compensation voltage Vc2 is substantially equal to a difference between the second compensation voltage Vc2 and the third compensation voltage Vc3.

The compensation portion 300 may sequentially output the plurality of compensation voltages Vc1, Vc2, Vc3, Vc4, Vc5, Vc6, Vc7, Vc8, and Vc9 during a predetermined period (e.g., the detection period). The compensation voltages Vc1, Vc2, Vc3, Vc4, Vc5, Vc6, Vc7, Vc8, and Vc9, sequentially output from the compensation portion 300, may be sequentially applied to the dummy gate lines DGL1, DGL2 and DGL3 of FIG. 3. For example, during the detection period, the first, second, third, fourth, fifth, sixth, seventh, eighth, and ninth compensation voltages Vc1, Vc2, Vc3, Vc4, Vc5, Vc6, Vc7, Vc8, and Vc9 are sequentially applied to the dummy gate lines DGL1, DGL2, and DGL3. A duration of each of the compensation voltages Vc1, Vc2, Vc3, Vc4, Vc5, Vc6, Vc7, Vc8, and Vc9 may be constant. For example, the duration of the first compensation voltage Vc1 applied to one dummy gate line and the duration of the second compensation voltage Vc2 applied to the dummy gate line may be substantially equal to each other.

The plurality of compensation voltages applied to the dummy gate line are sequentially applied to the gate electrode of the dummy switching element. The plurality of dummy drain currents are output from the dummy switching element based on the plurality of compensation voltages. For example, as the first, second, third, fourth, fifth, sixth, seventh, eighth, and ninth compensation voltages Vc1, Vc2, Vc3, Vc4, Vc5, Vc6, Vc7, Vc8, and Vc9 are applied to the gate electrode of the dummy switching element DTFT, the first, second, third, fourth, fifth, sixth, seventh, eighth, and ninth dummy drain currents Id1, Id2, Id3, Id4, Id5, Id6, Id7, Id8, and Id9 are output from the drain electrode of the dummy switching element DTFT. A q-th dummy drain current corresponds to a q-th compensation voltage. In other words, the q-th dummy drain current is a current generated by the q-th compensation voltage, where q is a natural number. For example, the first dummy drain current Id1 is a current generated by the first compensation voltage Vc1, the second dummy drain current Id2 is a current generated by the second compensation voltage Vc2, the third dummy drain current Id3 is a current generated by the third compensation voltage Vc3, the fourth dummy drain current Id4 is a current generated by the fourth compensation voltage Vc4, the sixth dummy drain current Id6 is a current generated by the sixth compensation voltage Vc6, the seventh dummy drain current Id7 is a current generated by the seventh compensation voltage Vc7, the eighth dummy drain current Id8 is a current generated by the eighth compensation voltage Vc8, and the ninth dummy drain current Id9 is a current generated by the ninth compensation voltage Vc9.

Each of the dummy drain currents Id1, Id2, Id3, Id4, Id5, Id6, Id7, Id8, and Id9 is sequentially output. The plurality of dummy drain currents Id1, Id2, Id3, Id4, Id5, Id6, Id7, Id8, and Id9 output from the dummy switching element DTFT are applied to the compensation portion 300 through the dummy pixel electrode DPE.

The compensation portion 300 selects one dummy drain current that has a smallest value among the plurality of dummy drain currents Id1, Id2, Id3, Id4, Id5, Id6, Id7, Id8, and Id9 applied thereto, and selects a compensation voltage corresponding to the selected dummy drain current. In other words, the compensation portion 300 selects a compensation voltage generated based on the selected dummy drain current. The compensation portion 300 applies the selected compensation voltage to the power supply portion 605. For example, the compensation portion 300 may select the sixth dummy drain current Id6 having a smallest value among the first, second, third, fourth, fifth, sixth, seventh, eighth, and ninth dummy drain currents Id1, Id2, Id3, Id4, Id5, Id6, Id7, Id8, and Id9 generated during the compensation period, and selects and outputs the sixth compensation voltage Vc6 corresponding to the sixth dummy drain current Id6. In this example, the sixth compensation voltage Vc6 is a voltage having a value of about −7 V.

As described above, the power supply portion 605 outputs the gate-off voltage Voff which is a DC voltage. For example, the power supply portion outputs the compensation voltage selected by the compensation portion 300 as the gate-off voltage Voff. For example, the power supply portion 605 corrects the gate-off voltage Voff so that the gate-off voltage Voff has a value substantially equal to a value of the compensation voltage applied from the compensation portion 300. In other words, the power supply portion 605 outputs the gate-off voltage Voff having a value substantially equal to a value of the compensation voltage applied from the compensation portion 300. For example, the power supply portion 605 may output a gate-off voltage Voff having a value of about −7 V.

The gate-off voltage Voff output from the power supply portion 605 is applied to the dummy pixel DPX. For example, the gate-off voltage Voff applied from the power supply portion 605 is applied to the dummy gate line DGL connected to the dummy pixel DPX. The dummy switching element DTFT may be turned off by the gate-off voltage Voff.

In addition, the gate-off voltage Voff output from the power supply portion 605 is also applied to the gate driver 206. The gate driver 206 applies the gate-off voltage Voff applied from the power supply portion 605 to the pixel PX.

For example, the gate-off voltage Voff applied from the gate driver 206 is applied to the gate line GL or GL1 to GLi connected to the pixel PX.

The gate-off voltage Voff (e.g., the corrected gate-off voltage Voff) output from the power supply portion 605 may be applied to the dummy gate line DGL and the gate driver 206 after a part of the detection period or after an end time point of the detection period. The gate-off voltage Voff is maintained until a subsequent detection period (hereinafter, "a succeeding detection period"), and may be maintained at a same value or changed to another value in the succeeding detection period. The plurality of compensation voltages applied to the dummy gate line DGL in the succeeding detection period may include the aforementioned first, second, third, fourth, fifth, sixth, seventh, eighth, and ninth compensation voltages Vc1, Vc2, Vc3, Vc4, Vc5, Vc6, Vc7, Vc8, and Vc9. In other words, the plurality of compensation voltages output from the compensation portion 300 in the succeeding detection period may be substantially equal to the plurality of compensation voltages output from the compensation portion 300 in the detection period.

In an exemplary embodiment of the inventive concept, the dummy portion 700 connected to the compensation portion 300 of FIG. 15 may include the plurality of dummy pixels DPX1, DPX2, DPX3, DPX4, DPX5, DPX6, DPX7, DPX8, and DPX9 as illustrated in FIG. 4, which will be described in detail with reference to FIG. 16.

Figure 16:
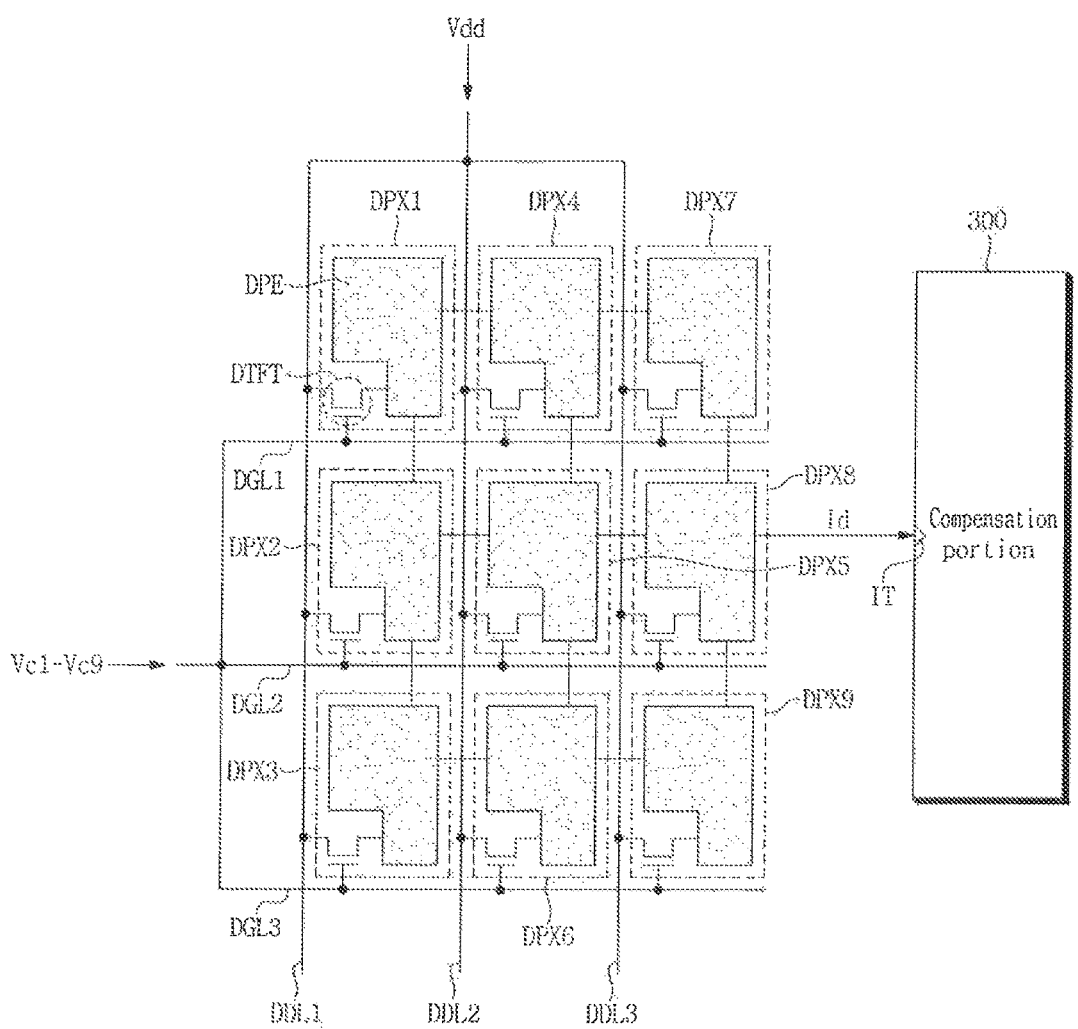
FIG. 16 is a detailed configuration view illustrating a dummy portion connected to the compensation portion of FIG. 15 according to an exemplary embodiment of the inventive concept.

FIG. 16 is a detailed configuration view illustrating the dummy portion connected to the compensation portion of FIG. 15 according to an exemplary embodiment of the inventive concept.

The dummy portion 700 may include the first, second, third, fourth, fifth, sixth, seventh, eighth, and ninth dummy pixels DPX1, DPX2, DPX3, DPX3, DPX4, DPX5, DPX6, DPX7, DPX8, and DPX9 as illustrated in FIG. 16. The first, second, third, fourth, fifth, sixth, seventh, eighth, and ninth dummy pixels DPX1, DPX2, DPX3, DPX4, DPX5, DPX6, DPX7, DPX8, and DPX9 of FIG. 16 are substantially identical to the first, second, third, fourth, fifth, sixth, seventh, eighth, and ninth dummy pixels DPX1, DPX2, DPX3, DPX4, DPX5, DPX6, DPX7, DPX8, and DPX9 of FIG. 4 described above.

However, the plurality of dummy gate lines DGL1, DGL2, and DGL3 are connected to one another. For example, the first dummy gate line DGL1, the second dummy gate line DGL2, and the third dummy gate line DGL3 are connected to one another. Thus, the aforementioned plurality of compensation voltages Vc1, Vc2, Vc3, Vc4, Vc5, Vc6, Vc7, Vc8, and Vc9 are applied to the dummy gate lines DGL1, DGL2, and DGL3 connected thereto. Accordingly, the first, second, third, fourth, fifth, sixth, seventh, eighth, and ninth dummy pixels DPX1, DPX2, DPX3, DPX4, DPX5, DPX6, DPX7, DPX8, and DPX9 all receive substantially equal compensation voltages Vc1, Vc2, Vc3, Vc4, Vc5, Vc6, Vc7, Vc8, and Vc9.

In addition, the respective dummy pixel electrodes of the dummy pixels DPX1, DPX2, DPX3, DPX4, DPX5, DPX6, DPX7, DPX8, and DPX9 are connected to one another. For example, the first, second, third, fourth, fifth, sixth, seventh, eighth, and ninth dummy pixel electrodes of the first, second, third, fourth, fifth, sixth, seventh, eighth, and ninth dummy pixels DPX1, DPX2, DPX3, DPX4, DPX5, DPX6, DPX7, DPX8, and DPX9 may be physically connected to one another. In other words, the first, second, third, fourth, fifth, sixth, seventh, eighth, and ninth dummy pixel electrodes may be formed unitarily.

The first, second, third, fourth, fifth, sixth, seventh, eighth, and ninth dummy pixel electrodes which are unitarily formed may be referred to as a common pixel electrode, and the common pixel electrode is connected to the compensation portion 300. For example, the common pixel electrode may be connected to an input terminal IT of the compensation portion 300.

A current (a leakage current) flowing through the first, second, third, fourth, fifth, sixth, seventh, eighth, and ninth dummy switching elements is combined through the common pixel electrode and input to the input terminal IT. For example, the combined current (the leakage current) may be one of the aforementioned first, second, third, fourth, fifth, sixth, seventh, eighth, and ninth dummy drain currents Id1, Id2, Id3, Id4, Id5, Id6, Id7, Id8, and Id9 illustrated in FIG. 15. The dummy drain current is applied to the compensation portion 300 through the input terminal IT.

The first dummy data line DDL1, the second dummy data line DDL2, and the third dummy data line DDL3 receive the dummy data voltage Vdd. In other words, the dummy data lines DDL all receive the substantially same dummy data voltage Vdd. Accordingly, the dummy data lines DDL are connected to one another.

The dummy data voltage Vdd is a DC voltage, and may be generated from one of the power supply portion 605, the data driving IC (one of the data driving ICs 310_1 to 310_k), and the compensation portion 300. In other words, the dummy data voltage Vdd may be applied or output from one of the power supply portion 605, the data driving IC (one of the data driving ICs 310_1 to 310_k), and the compensation portion 300.

FIG. 17 is a flowchart illustrating an operation of the compensation portion of FIG. 15 according to an exemplary embodiment of the inventive concept.

As illustrated in FIG. 17, when the display device 500 is completed, an outgoing inspection is performed on the display device 500 (S11). Next, the display device 500 is turned on for the first time, e.g., after arriving at the buyer's home (S12).

When the display device 500 is turned on, the compensation portion 300 operates (S13), a detailed operation of which will be described below.

First, the compensation portion 300 counts a time from the on-time point Ton of the display device 500 and determines whether the counted time (e.g., the driving time of the display device 500) is equal to or exceeds the start time point Tff of the first frame period (S14). Based on the determination result, when it is determined that the driving time of the display device 500 is before the start time point Tff of the first frame period, the compensation portion 300 generates the compensation voltage and applies the compensation voltage to the power supply portion (S15). The compensation voltage refers to the compensation voltage calculated at the compensation portion 300 of FIG. 15.

On the other hand, based on the determination result in operation S14, when it is determined that the driving time of the display device 500 has passed the start time point Tff of the first frame period, the compensation portion 300 determines whether the driving time of the display device 500 reaches or exceeds a time T (S16). Based on the determination result in operation S16, when it is determined that the driving time of the display device 500 reaches or exceeds the time T, the compensation portion 300 generates the compensation voltage and applies the compensation voltage to the power supply portion 605 (S17). The compensation voltage refers to the compensation voltage detected by the compensation portion 300 of FIG. 15.

On the other hand, based on the determination result in operation S16, when it is determined that the driving time of the display device 500 has not reached the time T, the compensation portion 300 repeats the operation S16 until the condition of the operation S16 is satisfied.

In addition, the operation S14 may be omitted. In this case, the compensation portion 300 may apply the compensation voltage immediately after the display device 500 is turned on. In other words, the compensation portion 300 may apply the compensation voltage at the first detection time point T1 described above.

As set forth hereinabove, the display device according to exemplary embodiments of the inventive concept may provide the following effects.

As a driving time of the display device increases, a deterioration degree of a switching element of a pixel increases. In other words, as the driving time of the display device increases, a threshold voltage of the switching element shifts in a negative direction. Accordingly, when the driving time of the display device increases, a leakage current of the switching element also increases. A compensation portion included in the display device according to exemplary embodiments of the inventive concept generates a gate-off voltage having an optimal level according to the driving time of the display device. Accordingly, the leakage current of the switching element may be reduced.

In addition, even when the threshold voltage of the switching element shifts in a positive direction, the compensation portion according to exemplary embodiments of the inventive concept may detect this variation. Accordingly, even when the threshold voltage of the switching element shifts in a positive direction, a gate-off voltage having an optimal level may be generated substantially invariably.

Moreover, the compensation portion according to exemplary embodiments of the inventive concept may optimize gate-off voltages in different display panels according to the characteristics of the display panels.

While the inventive concept has been illustrated and described with reference to exemplary embodiments thereof, it will be apparent to those of ordinary skill in the art that various changes in form and details may be made thereto without departing from the spirit, and scope of the inventive concept, as set forth by the following claims.

What is claimed is:

1. A display device comprising:
   a substrate;
   a gate line, a dummy gate line, a data line, a dummy data line, a pixel electrode, and a dummy pixel electrode, each disposed on the substrate;
   a switching element connected to the gate line, the data line, and the pixel electrode;
   a dummy switching element connected to the dummy gate line, the dummy data line, and the dummy pixel electrode;
   a compensation circuit configured to detect a change amount of a drain current based on drain currents generated front the dummy pixel at different time points, and configured to detect a change amount of a gate voltage of the dummy switching element in a linear region including a threshold voltage of the dummy switching element, based on the change amount of the drain current;
   a power supply circuit configured to correct and output a gate-off voltage based on the change amount of the gate voltage detected by the compensation circuit; and
   a gate driver configured to apply the gate-off voltage from the power supply circuit to the gate line.

2. The display device of claim 1, wherein the dummy gate line comprises a first dummy gate line, a second dummy gate line, and a third dummy gate line separated from one another,
- wherein the dummy pixel electrode comprises a first dummy pixel electrode, a second dummy pixel electrode, and a third dummy pixel electrode separated from one another, and
- wherein the dummy switching element comprises: a first dummy switching element connected to the first dummy gate line, the dummy data line, and the first dummy pixel electrode; a second dummy switching element connected to the second dummy gate line, the dummy data line, and the second dummy pixel electrode; and a third dummy switching element connected to the third dummy gate line, the dummy data line, and the third dummy pixel electrode.

3. The display device of claim 2, wherein the different time points comprise a first time point and a second time point that is delayed in time with respect to the first time point, and
- wherein, at the first time point and the second time point, the compensation circuit applies a first gate voltage to the first dummy gate line, applies a second gate voltage different from the first gate voltage to the second dummy gate line, applies a third gate voltage different from the second gate voltage to the third dummy gate line, applies a dummy data voltage to the dummy data line, receives a first drain current from the first dummy pixel electrode, receives a second drain current from the second dummy pixel electrode, and receives a third drain current from the third dummy pixel electrode.

4. The display device of claim 3, wherein the first gate voltage, the second gate voltage, and the third gate voltage are in the linear region.

5. The display device of claim 3, wherein the compensation circuit
- generates a first regression curve and a first equation with respect to the first regression curve, wherein the first regression curve is generated based on the first gate voltage, the second gate voltage, the third gate voltage, the first drain current at the first time point, the second drain current at the first time point, and the third drain current at the first time point, and
- generates a second regression curve and a second equation with respect to the second regression curve, wherein the second regression curve is generated based on the first gate voltage, the second gate voltage, the third gate voltage, the first drain current at the second time point, the second drain current at the second time point, and the third drain current at the second time point.

6. The display device of claim 5, wherein the compensation circuit calculates a distance between the first regression curve and the second regression curve based on the first equation and the second equation, and calculates the change amount of the gate voltage based on the distance.

7. The display device of claim 6, wherein the compensation circuit applies a compensation voltage, corresponding to the change amount of the gate voltage, to the power supply circuit, and
- wherein the power supply circuit adds the compensation voltage to the gate-off voltage to generate a corrected gate-off voltage.

8. The display device of claim 6, wherein, when the change amount of the gate voltage exceeds a threshold value, the compensation circuit applies a compensation voltage, corresponding to the change amount of the gate voltage, to the power supply circuit, and
- the power supply circuit adds the compensation voltage to the gate-off voltage to generate a corrected gate-off voltage.

9. The display device of claim 3, wherein the first time point is between an on-time point of the display device and a first frame period.

10. The display device of claim 9, wherein the second time point is between the first frame period and an off time point of the display device.

11. The display device of claim 10, wherein the different time points further comprise a third time point that is delayed in time with respect to the second time point,
- wherein the third time point is between the first frame period and the off-time point of the display device, and
- wherein a length in time from a start time point of the first frame period to the third time point is longer than a length in time from the start time point of the first frame period to the second time point.

12. The display device of claim 1, wherein the gate-off voltage from the power supply circuit is further applied to the dummy gate line.

13. The display device of claim 1, wherein the pixel electrode and the switching element are disposed at a display area of the substrate, and
- wherein the dummy pixel electrode and the dummy switching element are disposed at a non-display area of the substrate.

14. The display device of claim 13, further comprising a first data driving integrated circuit connected to the data line.

15. The display device of claim 14, wherein the compensation circuit is embedded in the first data driving integrated circuit.

16. The display device of claim 14, further comprising a second data driving integrated circuit connected to another data line which is adjacent to the data line.

17. The display device of claim 16, further comprising:
- a first link line connected to the data line and the first data driving integrated circuit; and
- a second link line connected to the another data line and the second data driving integrated circuit,
- wherein the compensation circuit is disposed between the first link line and the second link line at the non-display area of the substrate.

18. The display device of claim 1, wherein each of the switching element and the dummy switching element comprises a channel area having a substantially equal size and a substantially identical shape.

19. A display device comprising:
- a substrate;
- a gate line, a dummy gate line, a data line, a dummy data line, a pixel electrode, and a dummy pixel electrode, each disposed on the substrate;
- a switching element connected to the gate line, the data line, and the pixel electrode;
- a dummy switching element connected to the dummy gate line, the dummy data line, and the dummy pixel electrode;
- a compensation circuit configured to sequentially apply a plurality of compensation voltages having different values to the dummy gate line, sequentially receive a plurality of drain currents generated by the plurality of compensation voltages through the dummy pixel, and select a compensation voltage corresponding to a drain current having a smallest value among the plurality of drain currents applied to the compensation circuit;

a power supply circuit configured to output the compensation voltage selected by the compensation circuit as a gate-off voltage; and a gate driver configured to apply the gate-off voltage from the power supply circuit to the gate line.

20. The display device of claim 19, wherein the plurality of compensation voltages have an arithmetic progression relationship.

21. A method of operating a display device including a compensation circuit and a power supply circuit, the method comprising:

determining whether a driving time of the display device is greater than or equal to a start time point of a first frame period;

applying, by the compensation circuit, a compensation voltage to the power supply circuit when the driving time is not greater than or equal to the start time point;

determining whether the driving time is greater than or equal to a first time, wherein the first time is a time length between the start time point and a first detection time point;

determining whether a Change amount of a dummy gate voltage is greater than a threshold value when the driving time is greater than or equal to the first time;

applying, by the compensation circuit, the compensation voltage to the power supply circuit when the change amount is greater than the threshold value;

determining whether the driving time is greater than or equal to a second time, wherein the second time is greater than the first time; and applying, by the compensation circuit, the compensation voltage to the power supply circuit when the driving time is greater than or equal to the second time.

* * * * *